(12) United States Patent
Aggarwal et al.

(10) Patent No.: US 9,524,393 B2
(45) Date of Patent: Dec. 20, 2016

(54) SYSTEM AND METHODS FOR ANALYZING AND MODIFYING PASSWORDS

(71) Applicant: The Florida State University Research Foundation, Inc., Tallahassee, FL (US)

(72) Inventors: Sudhir Aggarwal, Tallahassee, FL (US); Shiva Houshmand Yazdi, Tallahassee, FL (US); Charles Matt Weir, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 101 days.

(21) Appl. No.: 14/266,277

(22) Filed: Apr. 30, 2014

(65) Prior Publication Data

US 2014/0373088 A1    Dec. 18, 2014

Related U.S. Application Data

(63) Continuation of application No. PCT/US2012/062730, filed on Oct. 31, 2012.

(60) Provisional application No. 61/553,554, filed on Oct. 31, 2011.

(51) Int. Cl.
   *G06F 21/60*     (2013.01)
   *G06F 21/46*     (2013.01)

(52) U.S. Cl.
   CPC ............ *G06F 21/604* (2013.01); *G06F 21/46* (2013.01)

(58) Field of Classification Search
   CPC ............................. G06F 21/604; G06F 21/46
   See application file for complete search history.

(56) References Cited

U.S. PATENT DOCUMENTS

| 8,539,247 | B2 * | 9/2013 | McGrew | G06F 21/46 713/182 |
| 8,769,607 | B1 * | 7/2014 | Jerdonek | G06F 21/31 726/1 |
| 9,178,876 | B1 * | 11/2015 | Johansson | H04L 63/0846 |
| 2008/0063192 | A1 | 3/2008 | Goubin et al. | |

(Continued)

OTHER PUBLICATIONS

Aggarwal, et al., "Building Better Passwords using Probabilistic Techniques", ACSAC '12, Dec. 3-7, 2012, Orlando, Florida USA.*

(Continued)

*Primary Examiner* — Joseph P Hirl
*Assistant Examiner* — J. Brant Murphy
(74) *Attorney, Agent, or Firm* — Nilay J. Choksi; Smith & Hopen, P.A.

(57) ABSTRACT

A system for analyzing and modifying passwords in a manner that provides a user with a strong and usable/memorable password. The user would propose a password that has relevance and can be remembered. The invention would evaluate the password to ascertain its strength. The evaluation is based on a probabilistic password cracking system that is trained on sets of revealed passwords and that can generate password guesses in highest probability order. If the user's proposed password is strong enough, the proposed password is accepted. If the user's proposed password is not strong enough, the system will reject it. If the proposed password is rejected, the system modifies the password and suggests one or more stronger passwords. The modified passwords would have limited modifications to the proposed password. Thus, the user has a tested strong and memorable password.

14 Claims, 7 Drawing Sheets

(56) References Cited

U.S. PATENT DOCUMENTS

| | | | |
|---|---|---|---|
| 2008/0288781 A1 | 11/2008 | Lawson et al. | |
| 2008/0307235 A1* | 12/2008 | Keohane | G06F 21/46 713/183 |
| 2009/0150677 A1* | 6/2009 | Vedula | G06F 21/46 713/183 |
| 2009/0150971 A1* | 6/2009 | Vedula | G06F 21/31 726/1 |
| 2010/0299727 A1 | 11/2010 | More et al. | |
| 2011/0252243 A1 | 10/2011 | Brouwer et al. | |
| 2011/0314294 A1* | 12/2011 | McGrew | G06F 21/46 713/182 |

OTHER PUBLICATIONS

Glodek, William, "Using a Specialized Grammar to Generate Probable Passwords" (2008). Electronic Theses, Treatises and Dissertations. Paper 4238.*

Weir et al., Testing metrics for password creation policies by attacking large sets of revealed passwords. Proceedings of the 17th ACM Conference on Computer and Communications Security (CCS '10). Chicago, Illinois. 2010: 162-175.

Verheul. Selecting secure passwords. Topics in Cryptology—CT-RSA 2007: M. Abe (Ed.) 2007. Lecture Notes in Computer Science. 4377: 49-66.

Stone-Gross et al., Your botnet is my botnet: Analysis of a botnet takeover. Proceedings of the 16th ACM Conference on Computer and Communications Security (CCS '09). Chicago, Illinois. 2009: 635-347.

Shay et al., Encountering stronger password requirements: user attitudes and behaviors. 6th Symposium on Usable Privacy and Security (SOUPS). Redmond, WA. 2010: 1-20.

Riley. Password security: what users know and what they actually do. Usability News. 2006. vol. 8 (No. 1): 1-5.

Furnell. An assessment of website password practices. Computers & Security. 2007. vol. 26: 445-451.

Burr et al., NIST special publication 800-63-1 electronic authentication guideline. National Institute of Standards and Technology. U.S. Department of Commerce. Gaithersburg, MD. 2011: 1-121.

Zhang et al., The security of modern password expiration: an algorithmic framework and empirical analysis. Proceedings of 17th ACM Conference on Computer and Communication Security (CCS '10). Chicago, Illinois. 2010:176-186.

Inglesant and Sasse. The true cost of unusable password policies: password use in the wild. CHI 2010: Privacy Behavior. Atlanta, Georgia. 2010: 383-392.

Charoen et al., Improving end user behavior in password utilization. Systemic Practice and Action Research. 2008. vol. 21: 55-72.

Adams and Sasse. Users are not the enemy. Communications of the ACM. 1999. vol. 42 (No. 12): 40-46.

Campbell et al., Impact of restrictive composition policy on user password choices. Behavior and information technology. 2011. vol. 30 (No. 3): 379-388.

Florencio and Herley. A large-scale study of web password habits. Proceeding of the 16th Int. Conf. on World Wide Web (WWW '07). Track: Security, Privacy, Reliability, and Ethics. Session: Passwords and Phishing. Banff, Alberta, Canada. 2007: 657-665.

Komanduri et al, Of passwords and people: measuring the effect of password-composition policies. Proceeding the SIGCHI Conference on Human Factors in Computing Systems (CHI '11). Session: Authentication. Vancouver, BC, Canada. 2011: 2595-2604.

Bard. Spelling-error tolerant, order independent pass-phrases via the Damerau-Levenshtein string-edit distance metric. Proceedings of the Fifth Australasian Symposium on ACSW Frontiers. Ballarat, Australia. 2007. vol. 68: 117-124.

Yan et al., The memorability and security of passwords—some empirical results. Technical Report No. 500. Computer Laboratory, University of Cambridge. 2000: 1-11.

Forget et al., Improving text passwords through persuasion. Symposium on Usable Privacy and Security (SOUPS). Pittsburgh, PA. 2008: 1-12.

Yan. A note on proactive password checking. Proceedings of the 2001 workshop on New Security Paradigms (NSPW '01). Cloudcroft, New Mexico. 2001: 127-135.

Spafford. OPUS: preventing weak password choices. Computers& Security. 1992. vol. 11: 273-278.

Schetcher et al., Popularity is everything: a new approach to protecting passwords from statistical-guessing attacks. HotSec'10: Proceedings of the 5th USENIX conference on Hot Topics in Security. 2010: 1-6.

Castelluccia et al., Adaptive password-strength meters from Markov models. NDSS '12. 2012.

Weir et al., Password Cracking Using Probabilistic Context Free Grammars. Proceedings of the 30th IEEE Symposium on Security and Privacy. 2009: 391-405.

Shannon. Prediction and entropy of printed English. Bell Systems Tech. J. 1951. vol. 30: 50-64.

Massey. Guessing and entropy. 1994 IEEE Symposium on Information Theory. 1994: 204.

Damerau. A technique for computer detection and correction of spelling errors. Communications of the ACM. 1964. vol. 7 (No. 3): 171-176.

Vance. If your password is 123456, just make it hackme. New York Times. 2010. Date Accessed Sep. 2, 2014. http://www.nytimes.com/2010/01/21/technology/21password.html.

Warren. Thousands of Hotmail Passwords Leaked. 2009. Date Accessed Sep. 2, 2014. http://www.neowin.net/news/main/09/10/05/thousands-of-hotmail-passwords-leaked-online.

The Open wall group,.John the Ripper password cracker. Date Accessed Jul. 30, 2014. http://www.openwall.com/john/.

A list of popular password cracking wordlists. 2005. Date Accessed Sep. 2, 2014. http://www.outpost9.com/files/WordLists.html.

McMillan. Phishing attack targets MySpace users. 2006. Date Accessed Sep. 2, 2014. http://www.infoworld.com/d/security-central/phishing-attack-targets-myspace-users-614.

Morris and Thompson. Pasword security: a case history. Communications of the ACM. 1979. vol. 22 (No. 11): 594-597.

Weir. Using Probabilistic Techniques to aid in Password Cracking Attacks. Dissertation. Florida State University. 2010: 1-140.

Booth and Thompson. Applying Probability Measures to Abstract Languages. IEEE Transactions on Computers. vol. C-22 (No. 5). 1973: 442-450.

Kuo et al., Human Selection of Mnemonic Phrase-based Passwords. Symp. on Usable Privacy and Security (SOUPS). 2006: 1-12.

Monrose et al., Password hardening based on keystroke dymanics. ACM Conference on Computer and Communications Security. CCS. 1999: 73-82.

Manber. A simple scheme to make passwords based on one-way functions much harder to crack. Computer & Security. 1996. vol. 15 (No. 2): 171-176.

Sophos. Security at risk as one third or surfers admit they use the same passwords for all websites. 2009. Date Accessed Jul. 30. 2014. http://www.sophos.com/pressoffice/news/articles/2009/03/password-security.html.

Stanton et al., An analysis of end user security behaviors. Computers & Security. 2005. vol. 24: 124-133.

Google. Creating a strong password. Accounts Help. Date Accessed Jul. 30, 2014. https://support.google.com/accounts/answer/32040?rd=1.

Cachin. Entropy Measures and Unconditional Security in Cryptography. PhD Thesis. Swiss Federal Institute of Technology Zurich. ETH Disseratation. No. 12187. 1997: 1-155.

Shannon. A Mathematical Theory of Communication. Bell System Technical Journal. 1948. vol. 27 (No. 3): 379-423, 623-656.

Windows. Tips for creating a strong password. Date Accessed Sep. 4, 2014. http://windows.microsoft.com/en-us/windows-vista/tips-for-creating-a-strong-password.

International Search Report and Written Opinion for PCT/US2012/062730 (filing date: Oct. 31, 2012) with a mailing date of Aug. 23, 2013; Applicant: The Florida State University Research Foundation, Inc. et al.

(56) References Cited

OTHER PUBLICATIONS

International Preliminary Report on Patentability for PCT/US2012/062730 (filing date: Oct. 31, 2012) with a priority date of Oct. 31, 2011; Applicant: The Florida State University Research Foundation, Inc. et al.

* cited by examiner

| Base Structure | | | $S_2$ | | | $D_2$ | | |
|---|---|---|---|---|---|---|---|---|
| $b_1$ | $\frac{n_{b1}}{N_b}$ | $\frac{n_{b1}}{N_b}+\alpha$ | $s_1$ | $\frac{n_{s1}}{N_s}$ | $\frac{n_{s1}}{N_s}+\alpha$ | $d_1$ | $\frac{n_{d1}}{N_d}$ | $\frac{n_{d1}}{N_d}+\alpha$ |
| $b_2$ | $\frac{n_{b2}}{N_b}$ | $\frac{n_{b2}}{N_b}+\alpha$ | $s_2$ | $\frac{n_{s2}}{N_s}$ | $\frac{n_{s2}}{N_s}+\alpha$ | $d_2$ | $\frac{n_{d2}}{N_d}$ | $\frac{n_{d2}}{N_d}+\alpha$ |
| $b_3$ | $\frac{n_{b3}}{N_b}$ | $\frac{n_{b3}}{N_b}+\alpha$ | $s_3$ | $\frac{n_{s3}}{N_s}$ | $\frac{n_{s3}}{N_s}+\alpha$ | $d_3$ | $\frac{n_{d3}}{N_d}$ | $\frac{n_{d3}}{N_d}+\alpha$ |
| . . . | | | . . . | | | . . . | | |
| $b_j=S_2D_2L_4$ | $\frac{n_{bj}}{N_b}$ | $\frac{n_{bj}}{N_b}+\alpha$ | $s_j=!!$ | $\frac{n_{sj}}{N_s}$ | $\frac{n_{sj}}{N_s}+\alpha$ | $d_j=?8$ | $\frac{n_{dj}}{N_d}$ | $\frac{n_{dj}}{N_d}+\alpha$ |
| . . . | | | . . . | | | . . . | | |
| $b_m$ | $\frac{n_{bm}}{N_b}$ | $\frac{n_{bm}}{N_b}+\alpha$ | $s_k$ | $\frac{n_{sk}}{N_s}$ | $\frac{n_{sk}}{N_s}+\alpha$ | $d_t$ | $\frac{n_{dt}}{N_d}$ | $\frac{n_{dt}}{N_d}+\alpha$ |

*FIG. 5*

SYSTEM AND METHODS FOR ANALYZING AND MODIFYING PASSWORDS

CROSS-REFERENCE TO RELATED APPLICATIONS

This nonprovisional application is a continuation of prior filed International Application PCT/US2012/062730 filed Oct. 31, 2012, and claims priority to provisional application No. 61/553,554, entitled "Password Analyzer and Modifier, and its Methods of Use and Production Thereof", filed by the same inventor on Oct. 31, 2011, which is incorporated herein by reference.

FEDERALLY SPONSORED RESEARCH OR DEVELOPMENT

This invention was made with Government support under Grant No. 2006-DN-BX-K007 awarded by the National Institute of Justice. The government has certain rights in the invention.

BACKGROUND OF THE INVENTION

1. Field of the Invention

This invention relates to password analysis and modification. More specifically, it relates to analyzing password strength and developing strong passwords that are secure against efficient password cracking.

2. Description of the Prior Art

The use of passwords for protecting access is now ubiquitous in the Internet age, as Internet-based systems, such as online banking and online commerce, continue to rely heavily on passwords for authentication security. Human memorable passwords are thus a key element in the security of such systems. However, most users do not have the information to ensure that they are in fact using a "strong" password rather than one that can easily be broken. This limitation has led to the use and advocacy of password creation policies that purport to help the user in ensuring that the user chosen password is not easily breakable. The most prevalent password creation policy is the rule-based approach wherein users are given rules such as minimum length of eight characters and must contain an upper case letter and a special symbol. It has been shown by several authors that this approach by itself is not very effective (M. Weir, S. Aggarwal, M. Collins, and H. Stern, "Testing metrics for password creation policies by attacking large sets of revealed passwords," Proceedings of the 17th ACM Conference on Computer and Communications Security (CCS '10); Oct. 4-8, 2010, pp. 163-175; E. R. Verheul, "Selecting secure passwords," M. Abe (Ed.): CT-RSA 2007, LNCS 4377, pp. 49-66, 2007). A second type of password creation policy can be termed the random approach where an effectively random string is given by a system to the user. Clearly, the random approach has the problem that the given string is generally non-memorable, so the purpose of having a password that can easily be remembered is defeated.

A strong password is one that is difficult to guess or crack, yet users continue to employ weak passwords that can often be easily guessed or broken by available password cracking systems. Existing technology is mostly based on giving advice to users on how to create a "secure password." Such advice is essentially a password creation policy, which advises users to follow rules while creating passwords. Suggested password creation rules include minimum length, use of upper case letters, lower case letters, and special symbols, including particular symbols. However, problems with these rules include inconsistencies within policies that are not based on a scientific approach, consequently resulting in a lack of strong passwords.

Moreover, current technologies tend to frustrate users when creating passwords because they do not allow users to utilize their normal password methods for choosing passwords. This leads to coping strategies, such as repeating a word just to make their passwords long enough to satisfy the policy requirements, which actually reduces password strength. Current restrictive policies are not user-friendly. These policies emphasize resistance to brute-force attacks, thus opening the password up to dictionary-based attack methods.

Existing technology also provides for password checkers that try to help users by providing a tool for them to check their password strength. These checkers propose to measure the strength of the proposed password based on certain parameters of the password. They check the password against some rules, give weights to the rules, and find an overall numeric value for the strength of the password. However, the rules used and weights given to the rules when applied to different parts of the proposed passwords are ad-hoc and have no scientific or empirical basis. These checkers do not define strength of a password based on evidence from real attacks, but define strength of a password generally based only on password structure, for example length of password, whether it can be found in the dictionary, etc.

Although not really an analysis of password strength, many studies attempt to determine various aspects of how users choose passwords. In Shannon Riley, "Password security: what users know and what they actually do," Usability News, 8(1), 2006, Riley reports that in a study of 315 participants, about 75% of them reported that they have a set of predetermined passwords that they use frequently. Almost 60% reported that they do not change the complexity of their password depending on the nature of the website they use. In B. Stone-Gross, M. Cova, L. Cavallaro, B. Gilbert, M. Szydlowski, R. Kemmerer, C. Kruegel, and G. Vigna, "Your botnet is my botnet: Analysis of a botnet takeover," Tech. Rep., April 2009, Stone-Gross et al. collected around 298 thousands passwords from the Torpig botnet. They found that almost 28% of users reused their passwords and they managed to crack over 40% of the passwords in less than 75 minutes. This illustrates that having strong passwords for less important websites such as social networking websites is likely to be as necessary as for websites such as online banking.

Most organizations and websites follow a rule-based approach in recommending or enforcing password policies. A study by Shay et al. (R. Shay, S. Komanduri, P. G. Kelley, P. G. Leon, M. L. Mazurek, L. Bauer, N. Christin, and L. F. Cranor, "Encountering stronger password requirements: user attitudes and behaviors," In 6th Symposium on Usable Privacy and Security, July 2010) showed that users were not happy about changing the password creation policy to a stricter one and that it took on average 1.77 tries to create a new password accepted by the system based on a new password creation policy recently instituted. Riley (Shannon Riley, "Password security: what users know and what they actually do," Usability News, 8(1), 2006) also reports that the average length of time users maintained their primary password was reported as 31 months and 52% of them never change their password at all.

Rule-based advice is confusing as there is no consistency across systems and websites in the requirements, with differing advice about length, number of symbols and digits, and even in the symbols that can be used. In Furnell, S., "An assessment of website password practices," Computers & Security 26, 7-8 (2007), 445-451, it is shown that inconsistent and even contradictory recommendations make such advice unreliable for users. The U.S. NIST guideline (W. Burr, D. Dodson, R. Perlner, W. Polk, S. Gupta, E. Nabbus, "NIST special publication 800-63-1 electronic authentication guideline," National Institute of Standards and Technology, Gaithersburg, Md., April, 2006), the basis for most rule-based policies, proposed a rule-based approach that used the notion of Shannon entropy for estimating password strength based on suggested values of the components of the password. However, Weir et al. (M. Weir, S. Aggarwal, M. Collins, and H. Stern, "Testing metrics for password creation policies by attacking large sets of revealed passwords," Proceedings of the 17th ACM Conference on Computer and Communications Security (CCS '10), Oct. 4-8, 2010, pp. 163-175) performed password cracking attacks against multiple sets of real-life passwords and showed that the use of Shannon entropy as defined in MST is not an effective metric for gauging password strength and it does not give a sufficient model to decide on the strength of a given password.

Password expiration policies are designed to ensure stronger passwords over time. However, Zhang et al, (Y. Zhang, F. Monrose, and M, K. Reiter, "The security of modern password expiration: an algorithmic framework and empirical analysis," In Proceedings of ACM CCS'10, 2010) showed that an attacker can easily get access to an account by capturing the account's previous passwords. They suggest that at least 41% of passwords can be broken offline from a previous password in a matter of seconds and only five online password guesses suffices to break 17% of accounts. A more recent study (Philip G. Inglesant, M. Angela Sasse, "The true cost of unusable password policies: password use in the wild," Proc. of the 28th international conference on Human factors in computing systems, Apr. 10-15, 2010, Atlanta, Ga.) reports that although nowadays users understand the importance of secure behavior, they still find it too difficult to cope with password creation policies, and they rarely change their passwords due to the frustration of creating anew password along with the difficulty of memorizing it. In studies by Charoen et al. (Charoen, D., Raman, M., and Olfman, L., "Improving end user behavior in password utilization," Systemic Practice and Action Research, 21(1), 55. 2008) and Adams and Sasse (A. Adams and M. A. Sasse, "Users are not the enemy," Communications of the ACM, 42(12):40-46, 1999), it was found that users are not even unanimous about the necessity of having a strong password and the reason users choose insecure passwords is because they usually do not know how to create secure ones. Studies (J. Campbell, W. Ma, D. Kleeman, "Impact of restrictive composition policy on user password choices," Behavior and information technology, Vol. 30, No. 3, May-June 2011) show that even restrictive password creation policies do not have impact on the use of meaningful information in passwords, nor does it reduces reusing the password. Reuse can subject users to other types of attacks such as phishing, key-logging and targeted attacks (Florencio, D. and Herley, C., "A large-scale study of web password habits," In Proceeding of the 16th Int. Conf. on World Wide Web, 2007). A study by Shay et al. (R. Shay, S. Komanduri, P. G. Kelley, P. G. Leon, M. L. Mazurek, L. Bauer, N. Christin, L. F. Cranor, and S. Egelman, "Of passwords and people: measuring the effect of password-composition policies," Proceeding of 2011 Annual Conference on Human Factors in Computing Systems, 2011) shows that the more restrictive and complicated the policy, the less user-friendly it is.

There have been some studies (G. Bard, "Spelling-error tolerant, order independent pass-phrases via the Damerau-Levenshtein string-edit distance metric," Fifth Australasian Symposium on ACSW Frontiers—Volume 68 (Ballarat, Australia, Jan. 30-Feb. 2, 2007), 117-124; Yon, J. J., Blackwell, A., Anderson, R. and Grant A., "The memorability and security of passwords—some empirical results," Technical Report No. 500 (September 2000) Computer Laboratory, University of Cambridge) exploring the use of the random password generation approach. The major problem is the usability of the password for the user since such a password has typically no context for the user and is naturally hard to remember. In A. Forget, S. Chiasson, P. C. van Oorschot, R. Biddle, "Improving text passwords through persuasion," Symposium on Usable Privacy and Security (SOUPS) 2008, Jul. 23-25, 2008, Pittsburgh, Pa. USA, Forget et al. studied the memorability of passwords by randomly inserting or replacing fixed number of characters in a user chosen password. They showed that once the users confirmed their changed passwords, they could recall it as easily as the control group (passwords without change). However, they did not develop a methodology for analyzing the strength of these passwords.

Generating secure passwords is a tradeoff between creating a password that is hard to crack and usable. Some studies of passwords (Florencio, D. and Herley, C., "A large-scale study of web password habits," In Proceeding of the 16th Int. Conf. on World Wide Web, 2007; Yan, J. J., Blackwell, A., Anderson, R. and Grant A., "The memorability and security of passwords—some empirical results," Technical Report No. 500 (September 2000) Computer Laboratory, University of Cambridge) try to provide an understanding of how various policy factors make creating passwords easier, memorable, and usable, but none of them seem to have been applied in practice.

The work by Verheul (E. R. Verheul, "Selecting secure passwords," M. Abe (Ed.): CT-RSA 2007, LNCS 4377, pp. 49-66, 2007) is an excellent example of trying to understand the relationship of various entropy measures in order to build better passwords. Verheul showed how to build reasonable short secure passwords based on calculating the Shannon entropy with assumptions on the min entropy and guessing entropy. However, there was no attempt in this paper to consider the usability or memorability of the passwords or how to modify a user suggested password.

The analyze-modify approach also has some related history. The analysis is usually a simple way to determine if a password is weak such as checking against a dictionary. In reality, this is not really a sufficient condition for a password to be strong. Current proactive password checkers generally follow such a blacklisting approach. See for example Yan (J. Yan, "A note on proactive password checking," ACM New Security Paradigms Workshop, New Mexico, USA, 2001) and Spafford (E H Spafford, "OPUS: preventing weak password choices," Computers & Security (1992)). However, simple blacklisting approaches generally have problems with any sophisticated dictionary based attack.

Perhaps the most relevant study is Schechter et al. (S. Schechter, C. Herley, M. Mitzenmacher, "Popularity is everything: a new approach to protecting passwords from statistical-guessing attacks", HotSec'10: Proceedings of the 5th USENIX conference on Hot Topics in Security, 2010) in a study on popularity of passwords. They propose to build an oracle for existing passwords that are available to the Internet-scale authentication systems. They recommend that such popular passwords be disallowed and the main thrust of their work is to devise a way to efficiently store the large number of popular passwords that would be prohibited. An open question posed in their study is how to use the oracle without revealing the actual password to attackers while querying online. This study also runs across a storage problem. More recently, Castelluccia et al. (C. Castelluccia, M. Durmuth, D. Perito, "Adaptive password-strength meters from Markov models," NDSS '12, 2012) explores measuring the strength of passwords using a Markov approach.

Weir et al. (M. Weir, S. Aggarwal, M. Collins, and H. Stern, "Testing metrics for password creation policies by attacking large sets of revealed passwords," Proceedings of the 17th ACM Conference on Computer and Communications Security (CCS '10), Oct. 4-8, 2010, pp. 163-175) suggested that a probabilistic password attack system could be used to determine if a proposed password was weak and should be rejected. This probabilistic cracking system can be used for analyzing passwords. Once such an analysis is done, it can be shown how identified weak passwords can be effectively modified to be strong.

Accordingly, what is needed is a new password creation policy system that effectively analyzes password strength and modifies passwords in a manner that users can conveniently use the modified passwords. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The long-standing but heretofore unfulfilled need for password analysis and personalized modification is now met by a new, useful, and nonobvious invention.

In an embodiment, the current invention comprises a computer-implemented software application, the software accessible from a non-transitory media and providing instructions for a computer processor to analyze and modify a proposed password chosen by a user for a secured user account. The instructions provided by the software include generating a probabilistic context-free grammar from an array of control passwords aggregated from real-user passwords and establishing a threshold complexity value based on the effort required to crack the control passwords. Additionally, the user proposes a password in the software application. The strength/complexity value of the proposed password is then derived based on the context-free grammar. The complexity value of the proposed password is compared to the threshold value. The proposed password is accepted if its complexity value meets the threshold value, and is rejected if its complexity value does not meet the threshold value. If the proposed password is rejected, a modified password, or second proposed password, is generated by modifying the original proposed password in a limited manner (e.g., limited edit distance). Then the complexity value of the modified password is derived and compared to the threshold value. If the modified password is strong enough, it is suggested to the user.

The software may provide further instructions for receiving one or more dictionaries containing words that may be used for the alphabetic component of the proposed and/or modified password. The dictionary may further be utilized to determine the probabilistic context-free grammar and to generate guesses in highest probability order. Dictionaries may be dictionaries of English or foreign words, specialized dictionaries, dictionaries of known passwords, etc. and thus typically provide the alphabetic component of the control passwords in the password guesses. Probabilities may be also assigned to the dictionaries themselves.

The limited modifications may have an edit distance of only one (1), though more than one (1) is contemplated as well, if needed.

The software may provide further instructions for updating the probabilistic context-free grammar with the proposed password, modified password, and/or new control passwords. This likely increases entropy value of the context-free grammar to maintain a realistic and recent probability distribution for the context-free grammar if the additional passwords have a probability low enough to actually increase the entropy value.

The step of establishing the threshold value may include setting a lower bound for a number of password guesses for the proposed password until the threshold value is reached. In this case, the password guesses themselves do not need to be generated.

The software may provide further instructions for parsing the proposed password into a base structure containing a plurality of components, such that the modification step (i.e., modifying the proposed password) includes modifying the base structure or components with the limited modifications.

The limited modifications may include one or more of an insertion operation, a deletion operation, a substitution operation, a transposition operation, and a case operation. The operations of modification may include any one or more of the following rules. The insertion operation is permitted when the inserted component is not of the same type as its adjacent components. The deletion operation is permitted if the number of components is not one (1) and if the deletion does not cause two components of the same type to become adjacent. The substitution operation is permitted when substitution a character with another character of the same type. The transposition operation is permitted if it does not make two components of the same type adjacent to each other.

In a separate embodiment, the current invention comprises a computer-implemented method of analyzing and modifying a proposed password chosen by a user for a secured user account. The method includes steps for generating a probabilistic context-free grammar from an array of control passwords aggregated from real-user passwords and establishing a threshold complexity value based on the effort required to crack the control passwords. Additionally, the user proposes a password. The strength complexity value of the proposed password is then derived based on the context-free grammar. The complexity value of the proposed password is compared to the threshold value. The proposed password is accepted if its complexity value meets the threshold value, and is rejected if its complexity value does not meet the threshold value. If the proposed password is rejected, a modified password, or second proposed password, is generated by modifying the original proposed password in a limited manner (e.g., limited edit distance). Then the complexity value of the modified password is derived and compared to the threshold value. If the modified password is strong enough, it is suggested to the user.

The method may provide further steps for receiving one or more dictionaries containing words that may be used for the alphabetic component of the proposed and/or modified password. The dictionary may further be utilized to determine the probabilistic context-free grammar and to generate guesses in highest probability order. Dictionaries may be dictionaries of English or foreign words, specialized dictionaries, dictionaries of known passwords, etc. and thus typically provide the alphabetic component of the control passwords in the password guesses. Probabilities may be also assigned to the dictionaries themselves.

The limited modifications may have an edit distance of only one (1), though more than one (1) is contemplated as well, if needed.

The method may provide further steps for updating the probabilistic context-free grammar with the proposed password, modified password, and/or new control passwords. This likely increases entropy value of the context-free grammar to maintain a realistic and recent probability distribution for the context-free grammar if the additional passwords have a probability tow enough to actually increase the entropy value.

The step of establishing the threshold value may include setting a tower bound for a number of password guesses for the proposed password until the threshold value is reached. In this case, the password guesses themselves do not need to be generated.

The method may provide further steps for parsing the proposed password into a base structure containing a plurality of components, such that the modification step (i.e., modifying the proposed password) includes modifying the base structure or components with the limited modifications.

The limited modifications may include one or more of an insertion operation, a deletion operation, a substitution operation, a transposition operation, and a case operation.

The operations of modification may include any one or more of the following rules. The insertion operation is permitted when the inserted component is not of the same type as its adjacent components. The deletion operation is permitted if the number of components is not one (1) and if the deletion does not cause two components of the same type to become adjacent. The substitution operation is permitted when substitution character with another character of the same type. The transposition operation is permitted if it does not make two components of the same type adjacent to each other.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 5 is an example of adjusting probabilities for modified password "!!78liar";

DETAILED DESCRIPTION OF THE PREFERRED EMBODIMENT

Figure 1:
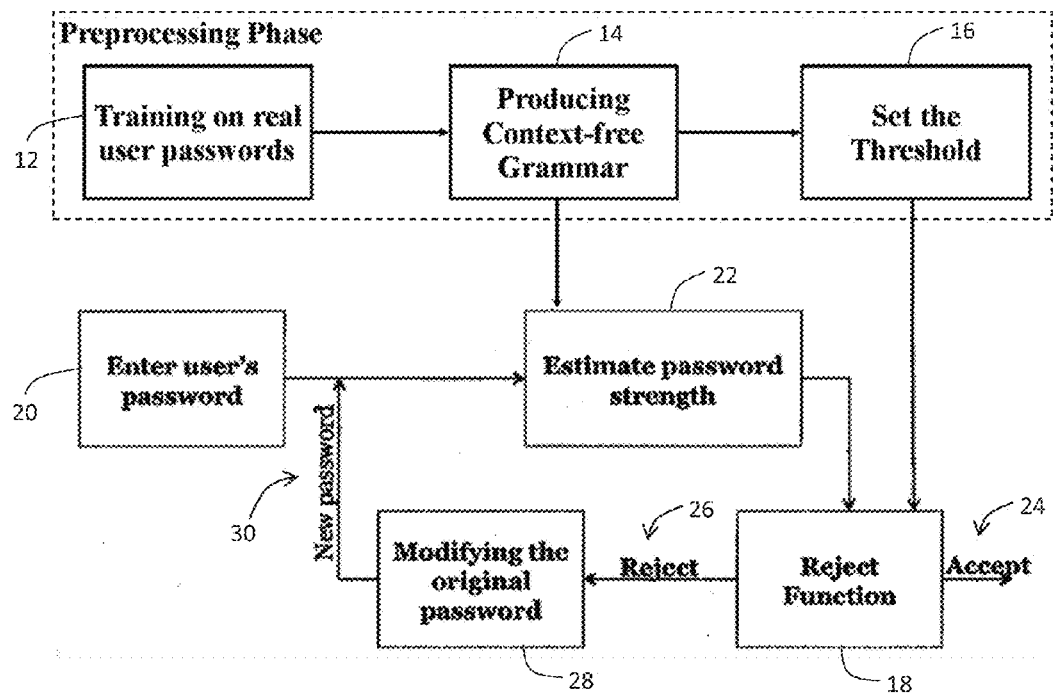
FIG. 1 is a flowchart depicting an overview of the design of certain embodiments of the current invention.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Embodiments of the current invention teach a novel approach to password creation in which a system analyzes a user's proposed password and then modifies it if the proposed password is too weak, for the purpose of strengthening the proposed password, yet preserving enough of the original password so that the new password is still memorable to the user. For example, this can be accomplished by changing the original password by an edit distance of only one. Generally, this process can be deemed an "analyze-modify" approach. In simplistic terms, the system can be viewed as having a reject function that rejects a weak password and as having a modify function that changes that weak password by an acceptable amount to a password that is appropriately strong.

Certain embodiments of the current invention propose implicit password creation policies combined with probabilistic password cracking to create a novel password analyzer and modifier. Implicit password creation policies are those in which the system has a "reject" function based on estimated password strength. A password is accepted or rejected based on a preset threshold for strength of the password. A password is strong if it takes a long time for an attacker to crack the password. A password is weak if it does not take a long time for an attacker to crack the password. Conventional password crackers, including a probabilistic password cracker such as that taught in U.S. patent application Ser. No. 13/547,779, entitled "Password Cracking Through Learning Probabilistic CFGs", which is incorporated herein by reference, can determine the probability of a password being cracked, thereby determining whether a password should be accepted or rejected. If the password were rejected, then the system would suggest a new password to the user with slight changes to the user's proposed password. Thus, the user can still have his/her chosen password as the base of the resultant strong password.

Empirical analysis based on trying to crack passwords using probabilistic techniques (M. Weir, Sudhir Aggarwal, Breno de Medeiros, Bill Glodek, "Password Cracking Using Probabilistic Context Free Grammars," Proceedings of the 30th IEEE Symposium on Security and Privacy, May 2009, pp. 391-405) can be adapted to analyze the strength of passwords. The associated probabilistic context-free grammar can be used to build a realistic reject function that can distinguish between strong and weak passwords based on a threshold probability. A dictionary of popular passwords can be incorporated into the empirical analysis to ensure that the modified password is not contained in the dictionary. A more important consideration is to show that the modified password is not likely to be cracked using any effective password-cracking techniques. The blacklisting approach is automatically subsumed by the choice of dictionaries. In an embodiment, the system protects against off-line attacks where an attacker has obtained a set of hashes (and likely user names) and desires to break as many passwords as possible in a reasonable amount of time.

Certain embodiments of the current invention provide a user with a strong and usable/memorable password. A user would propose a password that has relevance and can be remembered. The invention would evaluate the password to ascertain its strength. The evaluation is based on a probabilistic password cracking system that is trained on sets of revealed passwords and that can generate password guesses in highest probability order. If the user's proposed password is strong enough, the invention will accept it.

If the user's proposed password is not strong enough, the invention will reject it. If the proposed password is rejected, certain embodiments of the invention will suggest a set of new stronger passwords. The set of new stronger passwords will have limited modifications to the proposed password. Thus, the user will have a tested strong password and also one that the user can remember as well, in particular examples, the novel system is capable of strengthen passwords sufficiently by an edit distance of only one from the user's proposed password.

Further, the invention can dynamically adapt its suggestions with increasing use as well, such that it continues to generate strong passwords with a high likelihood of use. In other words, continual use of the system would continue to generate strong passwords, even if attackers become aware of the probabilistic distribution of passwords, as proven by multiple classical entropy measures.

Certain embodiments of the invention have one or more of the following functionalities and benefits: determination of strength of the proposed password based on how long it would take to crack that password in a real "optimal" attack; usability of the new suggested passwords ensuring only slight changes are made to the proposed password; and generation of strong passwords with a high likelihood of use.

The invention evaluates user-chosen password strength based on the probability of that password being cracked by an attacker the more guesses it takes for an attacker to crack a password, the more secure the password is. Furthermore, if the user's proposed password is not sufficiently strong, an unrelated new password is not generated. Rather, a new password is generated that is structurally similar to the user's proposed password. Therefore, the new password is usable and easy to remember for the user.

Certain embodiments of the invention also update the context-free grammar that is used to generate guesses. Thus, with each new password suggested by users, the system updates itself, such that an effective probabilistic password cracking system is maintained. The context-free grammar is driven to a higher entropy value.

Using the invention's algorithm to suggest a new password may increase both guessing entropy and the Shannon entropy of the relevant password distributions. Guessing entropy is the average number of tries needed for finding a password using an optimal password cracking system. Thus, it can be useful as a numerical, verifiable metric for password strength coupled with other metrics such as Shannon entropy and min-entropy.

Entropy is a method of measuring the uncertainty arising from a probability distribution, as suggested by Claude Shannon (C. E. Shannon, "Prediction and entropy of printed English," Bell Systems Tech. J., vol. 30, pp. 50-64, January 1951) in an effort to explore the uncertainty of letters and words in English.

To define Shannon entropy, let X be a discrete random variable with probability mass function $p(x)=\Pr\{X=x\}$, $x \in X$. The entropy $H(X)$ of such a random variable X is defined by:

$$H(X) = -\Sigma_x p(x) \log_2 p(x) \quad (1)$$

To define guessing entropy, as introduced by Massey (j. Massey, "Guessing and entropy," 1994 IEEE Symposium on Information Theory, pp. 204, 1994), assuming that the probabilities pi are denoted in a decreasing form $p1 \geq p2 \geq \ldots \geq pn$, the entropy $H(X)$ of such a random variable X is defined by:

$$G(X) = \Sigma_{i=1}^{i=n} i p_i \quad (2)$$

It is assumed that in an optimal attack, the attacker would try the highest probability passwords first, and thus guessing entropy measures the expected number of tries until success. However, it was shown by Verheul (E. R. Verheul, "Selecting secure passwords," M. Abe (Ed.): CT-RSA 2007, LNCS 4377, pp. 49-66, 2007) that simply having a high value of the guessing entropy itself is not sufficient since a distribution with a high value of guessing entropy is possible, even with the probability of the first potential guess p1 being very high and thus easily broken. A third notion is thus often used which is called the min entropy ($H\infty(X)=-\log 2\, p1$) (E. R. Verheul, "Selecting secure passwords," M. Abe (Ed.): CT-RSA 2007, LNCS 4377, pp. 49-66, 2007), if the min entropy is high, then the probability of the first password is small. Understanding of this concept began to form hackers began posting large numbers of revealed passwords online. Using the probabilistic password cracking system, based on training a context-free grammar, and using this grammar effectively simulated optimal password cracking attacks (trying the highest probability passwords first).

I. Probabilistic Password Cracking

The password cracking system as described in Weir et al. (M. Weir, Sudhir Aggarwal, Breno de Medeiros, Bill Glodek, "Password Cracking Using Probabilistic Context Free Grammars," Proceedings of the 30th IEEE Symposium on Security and Privacy, May 2009, pp. 391-405) and as taught in U.S. patent application Ser. No. 13/547,779 was used to derive the current system. Probabilistic context-free grammars can be utilized to model the derivation of real-user passwords and the way users create their passwords. The goal is to generate realistic guesses in decreasing order of probability where the probabilities are derived through training on large sets of revealed passwords. In Weir et al. and as described herein, password string components consisting of alphabet symbols are denoted as L, digits are denoted as D, special characters are denoted as S, and capitalization is denoted as M. A number is associated with each substring to show the length of the substring. For example, the password "football123!$" would be L8D3S2. Such strings are herein called the base structures. There are two steps in this password cracking approach Weir et al.: (1) generating the context-free grammar from a training set of disclosed real-user passwords, and (2) generating the actual guesses in probabilistic order using the grammar.

a. Step 1: Generating the Context-Free Grammar from a Training Set of Disclosed Real-User Passwords The observed base structures and frequencies are derived from the training set of passwords. Information about the probability of the digits, special characters, and capitalization (i.e., case) are also obtained from the training set. This information is used to generate the probabilistic context free grammar. The probability of any string derived from the start symbol is then the product of the probabilities of the productions used in its derivation, for example as seen in Table 1.

TABLE 1

Example probabilistic CFG.

| Left Hand Side | Right Hand Side | Probability |
| --- | --- | --- |
| $S\square$ | $D_3L_3S_1$ | 0.8 |
| $S\square$ | $S_2L_3$ | 0.2 |
| $D_3\square$ | 123 | 0.76 |
| $D_3\square$ | 987 | 0.24 |
| $S_1\square$ | ! | 0.52 |
| $S_1\square$ | # | 0.48 |
| $S_2\square$ | ** | 0.62 |
| $S_2\square$ | !@ | 0.21 |
| $S_2\square$ | !! | 0.17 |
| $L_3\rightarrow$ | dog | 0.5 |
| $L_3\rightarrow$ | cat | 0.5 |

Using this grammar, for example, the password "987dog!" can be derived with probability 0.04992, illustrated by the following:

$$S \rightarrow D3L3S1 \rightarrow 987L3S1 \rightarrow 987dogS1 \rightarrow 987dog!$$

The learning phase does not actually include determining probabilities of the alphabet strings since these are not considered to be a sufficient sample even for large training sets. Instead, tier example, the L3 part of the guess comes from a dictionary with probability equal to one over the number of words with length three (3). Furthermore, probability smoothing can be used to give an appropriately low probability value to digits, special symbols, case and base structures that do not arise in the training set.

b. Step 2: Generating the Actual Guesses in Probabilistic Order Using the Grammar The guess generation phase generates the possible password guesses in decreasing probability order using the context-free grammar obtained from the previous step. This decreasing probability order is critical to computing the guessing entropy. Multiple dictionaries can be used with probabilities associated to each dictionary.

II. Analyzing Password Strength

For a password to be strong, the password should not be easily broken. For memorability, an assumption must be made that the original password proposed by the user is a memorable password for that particular user. The first step is to evaluate the user-chosen password for strength based on the probability of that password being able to be cracked. To accomplish this, the probabilistic password cracking system, as previously discussed, was used. The cracking system was trained on a comprehensive set of real passwords. A threshold value was established, below which a password would be considered as strong. Establishing the threshold facilitates building of a reject function that accepts a strong password and rejects a weak password. Weak passwords are then modified by the current system to make them strong. An overview of different components of the analyze-modify system is illustrated in FIG. 1. In the preprocessing phase, the system was trained on real-user passwords 12 using the same technique used for training a probabilistic password cracker. This results in a probabilistic context free grammar 14 that can generate guesses in highest probability order. It is assumed that the training set used in this step is a comprehensive set of passwords (and a sufficiently large sample set) that can be used as a model of realistic passwords. Upon training the system, the threshold value can be determined 16, and thus the reject function can be established 18. Having entered the user's proposed password into the system 20, the system utilizes the context-free grammar to estimate/evaluate the proposed password's strength 22. If the proposed password is sufficiently strong, it can surpass the reject function and is accepted 24. If the proposed password is not sufficiently strong, the reject function rejects 26 the password, and the system modifies the proposed password 28. The new/modified password is created 30, and the cycle is repeated, as its strength is evaluated 22 and tested against the threshold 16 and reject function 18.

a. Setting the Threshold

Distinguishing between weak and strong passwords, a strong password is one for which it takes an attacker an appropriately long cracking time (ct) to crack that password (in hours). It is assumed that in an online attack, the attacker would use the optimal strategy of trying the highest probability passwords in decreasing order of probability. The threshold value (thp) is defined as that probability such that passwords with probability less than thp are strong and those passwords that are greater than or equal to thp are weak. Because probabilistic context-free grammar (plus appropriate dictionaries) is used as a model of realistic password distribution, the number of guesses g(thp) that the attacker would make before trying a password with a value equal to the threshold value thp can be determined. If r is the rate-per-hour of the guesses (based on the hash type, cracking system speed, etc.), the following equation can be derived:

$$g(thp) = ct*r$$

Given g(thp), the value of thp can be determined since this value (g(thp)) can be used to decide whether a given password is strong or weak.

There are at least two ways that the threshold can be determined. In the first approach, the probabilistic password cracker of the pre-processing phase can be run once, and a table can be generated that produces guesses and their probabilities at various time intervals. Although this approach is accurate and straightforward, it is not always feasible to reach the desired number of guesses due to time and resources. Table 2 shows the threshold table produced by running a guess generator trained on a set of over 1 million passwords. If the threshold is set at 2.96×10-13 and the probability of a password is less than this threshold, then it will take at least one (1) day to crack that password using an optimal password cracking strategy.

TABLE 2

Thresholds for the training_psw_checker grammar.

| Total number of guesses | Probability values | Time (in hours) (On 2.4 GHz Intel Core 2 Duo, MD5 hash) |
|---|---|---|
| 1,800,000,000 | $1.31 \times 10^{-11}$ | 1 |
| 14,400,000,000 | $1.59 \times 10^{-12}$ | 8 |
| 21,600,000,000 | $1.20 \times 10^{-12}$ | 12 |
| 28,800,000,000 | $6.37 \times 10^{-13}$ | 16 |
| 43,200,000,000 | $2.96 \times 10^{-13}$ | 24 |
| 86,400,000,000 | $9.94 \times 10^{-14}$ | 48 |
| 129,600,000,000 | $6.70 \times 10^{-14}$ | 72 |
| 172,800,000,000 | $5.29 \times 10^{-14}$ | 96 |
| 187,200,000,000 | $4.70 \times 10^{-14}$ | 104 |

The second approach provides only a lower bound for the number of guesses g(thp) until a given value thp is reached, but it only requires using the context-free grammar and does not require actually generating all the guesses. Thus, this approach is quicker than the first approach to determining threshold. Although this approach only gives a lower bound, it is conservative with respect to ensuring that a proposed password is strong. The algorithm starts with a threshold thp and estimates the number of elements in each base structure i (with probability pi) that are greater than this value. By doing a binary search, a password can be found with an index in each component of the base structure whose probability is the closest one to thp/pi, and thus calculate the number of guesses with probability greater than this value. This is done with each base structure. This also provides a table of the probabilities with the associated total number of guesses, for example as seen in Table 2.

b. The Analyze-Modify Reject Function

The current system begins by asking a user to enter or propose a chosen password, and receiving said proposed password. Using the probabilistic context-free grammar of the pre-processing phase, the probability of the chosen password can be calculated. First, the given password is parsed to its components. For example, if the password is Alice123!, it is parsed to L5M5D3S1. Next, the probability of the base structure L5D3S1 is found, along with the probabilities of alice, 123, ! and the mask ULLLL. The product of these probabilities is the probability of the user's password. This probability pu is compared with the threshold value to accept or reject the password.

An issue that might occur in this phase is the inability to determine the probability of pu from the context-free grammar. This could happen if the base structure or some other components of the user-chosen password are not included in the derived context-free grammar. If the base structure of the user-chosen password is not included in the context-free grammar, it can be either assumed that the password is strong enough and the password is accepted, or the lowest probability can be found for the base structures and this lowest probability can be set as an estimate for the probability of this base structure. In this embodiment, the latter approach was taken. If the digit component of the password or the special characters component were not initially in the training data, a probability associated with those values can still be found since the grammar includes these not-found values through smoothing. If the alphabet part of the password is not included in the dictionary, the probability associated with a word of the same length in the dictionary is used, since it is assumed that all words of the same length have equal probability. Thus, it can be determined whether the user's password is strong or weak.

III. Modifying a Weak Password

When the system rejects a password, the password should be modified but remain usable and memorable for the user. A usable and memorable password is a password that is easy to remember and type. Things people can remember are different for each grouping of people based on their age, situation, location, etc. There are also special names or numbers that are important only to a particular individual. A user should be free to choose any word, number(s) or special character(s) that mike sense to that user when initially proposing a password. An exception is that the password should be long enough, as otherwise, a brute force attack would be sufficient to crack the password.

If a password is rejected, the system generates passwords with slight changes to the user-chosen password using the system's distance function. The distance function is based on edit distance to fulfill the need of usability for users. This allows users to choose password components for their own memorability since only minimal changes are made to the originally proposed password. Hence, passwords are generated/modified with a distance of one from the user-chosen password, and the generated/modified password is confirmed or authenticated to be within the acceptable threshold value of password strength. Forget et al. (A. Forget, S. Chiasson, P. C. van Oorschot, R. Biddle, "Improving text passwords through persuasion," Symposium on Usable Privacy and Security (SOUPS) 2008, Jul. 23-25, 2008, Pittsburgh, Pa. USA) described a general concept that even several random changes, such as replacing or inserting up to four characters, were memorable by users. Thus, the system's modifications, which typically change only one character in the user-chosen password, would have a similar result. Alternatively, when the user-chosen password is sufficiently strong, the system can confirm or accept the password, as the password does not require any modification.

a. Distance Function

In an embodiment, the system utilizes a distance function similar to the Damerau-Levenshtein distance function (Damerau, F. J. "A technique for computer detection and correction of spelling errors. Communications of the ACM, vol. 7, Issue 3, pp. 171-176, March 1964) but with several modifications to make the function more efficiently for the current system. Two sets of operations exist for this distance function: (1) operations on the base structure, or (2) operations on a component.

Typically, an edit distance of one (1) in the current system is sufficient, but further edit distances may be utilized for different operations if needed. Additionally, it is preferred to edit only the numerical digits or special characters not alpha strings), except possibly to undergo a case operation, described infra. However, alternate embodiments of the system permit modification of alpha strings as well.

i. Operations on the Base Structure:

An insertion operation includes inserting a component of length one. This operation is permitted when the inserted component is not of the same type as its adjacent components. For example, if the base structure is L5D3S1, the component D1 can be inserted in the beginning to create a structure D1L5D3S1. However, the component L1 could not be inserted at the beginning to create L1L5D3S1 since components L1 and L5 would be of the same type and adjacent.

A deletion operation includes deleting a component of length greater than one. This operation is permitted if the number of components is not one (1) and if the deletion does not cause two components of the same type to become adjacent. For example, the component D2 can be deleted from base structure D2S1D1 to create structure S1D1. This can be done because D2 has a length greater than one and because it does cause two components of the same type to become adjacent. Further with base structure D2S1D1, the component S1 cannot be deleted both because it has a length of one and also because it causes two components of the same type to become adjacent (i.e., D2 and D1 become adjacent).

A transposition operation includes exchanging two adjacent components. This operation is permitted if it does not make two components of the same type adjacent to each other. For example, for base structure L5D3S1, adjacent components D3 and S1 can be exchanged. However, for base structure D2S1D1, adjacent components S1 and D1 cannot be exchanged.

ii. Operations on the Component:

An insertion operation includes inserting one character of the same type inside a component. For example, if component D3 is "123", the component can be modified to "4123" by inserting "4" at the beginning.

The deletion operation includes deleting one character from within a component. This operation is permitted if the length of the component is not equal to one (1).

A substitution operation includes substituting a character with another character of the same type. For example, if S2 is "!!", the component can be modified to "!#".

A case operation includes inverting the case (uppercase/lowercase) of one character in the alphabetical component of the password. For example, if L4 is "life", the component can be modified to "liFe".

b. Modifier Algorithm

When a user enters a proposed password, the system automatically parses the password to its base structure. To construct possible modified passwords, the base structure and components are modified as explained above, and all information maintained in a tree structure. The user-chosen password is the root of the tree, and the system track and recorded results of all possible operations within an edit distance of one. In the tree, a child node is the result of one of the above-referenced operations. After building the tree, the system begins from the root node and randomly chooses a child until a leaf node is obtained. If this password is within the acceptable threshold limit of password strength, the password is considered acceptable, unless the system randomly continues to attempt more modifications to the nodes. In an embodiment, during each tree traversal, the system can mark or flag each component previously tried, such that the system can find a different password during the next traversal.

TABLE 3

Example of passwords modified by the analyze-modify system

| Input of user-chosen password | Output of modifier |
| --- | --- |
| trans2 | %trans2 |
| colton00 | 8colton00 |
| 789pine | 789pinE |
| mitch8202 | mitch=8202 |
| cal1fero | cal8fero |
| KILLER456 | KILIER456 |
| violin22 | violin^22 |
| ATENAS0511 | 0511AETENAS |
| *zalena6 | *3zalena6 |
| KYTTY023 | KYTTY023r |

It is possible that the system may not obtain a password within distance one (1) with the desired probability. By selecting the new passwords at random, the system avoids or minimizes the possibility of suggesting the same password or modification to different users with the same or similar originally proposed passwords. In order to obtain a password with an edit distance of two (2), one could repeat the same steps for passwords with distance one (1) starting from any of the modified distance one (1) passwords. Table 3 shows a set of passwords given to the system as input and the output of the modifier component. It can be seen that very limited changes has been applied to the user-chosen password thus preserving the usability and memorability of the password.

IV. Dynamic Update

In an embodiment, the current system utilizes an update strategy that modifies the grammar periodically in order to maintain effectiveness of the system after users use the system for a period time. One option is that the system can propose less popular passwords to users (i.e., those having smaller probabilities) than the more common ones initially suggested when modification is needed. However, an issue that might arise after using the system for a period of time is that the probability distribution of passwords can change due to the passwords proposed by the system. Thus, whenever a recent set of real-user passwords become revealed, an attacker can use these for training their optimal password cracker. Since the supposedly strong passwords initially suggested by the system have theoretically become in use more often and would have higher probability in the guessing generator, the attacker has a better model of the system's generator. Thus, continued use of the original grammar may become problematic. Obviously, the most recent set of passwords can be used as the training set for the system to overcome this problem, but it would not always be easy to access a large set of real-user passwords. Instead, the system considers every modified password that has been suggested to a user as a publicly disclosed password—with an appropriate weight—to be used as if each modified password were in the training set. By effectively adding every new password to the training set, the system maintains a realistic and recent probability distribution for the probabilistic grammar. For example, if a particular password structure has low probability and is suggested numerous times by the system, the system dynamically adapts and uses that structure less frequently since every modified password (including each of this particular password structure) is added to the training set.

a. Updating the Grammar

To update the training set, it is not required that the system's proposed password be added to the training set, the training step repeated, and the context-free grammar reproduced again. Rather, the probability values should be adjusted in the context-free grammar. The probability values in the grammar are the frequencies of each structure or component used in the training set. Whenever a new password has been suggested, the system needs to update only the frequency of the components and base structures used in that password. For example, if the new password is "!!78liar", only the probabilities of the base structure and of S2 and D2 are changed. The probability of "liar" is not changed since, as previously discussed, probabilities of words do not come from the training set but from the dictionary. Again, the system considers all the words (whether they are included in the dictionary or whether they are not) the same based on length.

By considering the probability of each element (of the base structure or the component) as its frequency in the training set, the following equation is produced:

$$p_i = n_i/N, \quad (4)$$

where ni is the number of occurrences of the element and N is the total number of elements. With this in mind, seeing another element i would change the probability to the following formula:

$$p_i = (n_i + \alpha)/(N + \alpha) \quad (5)$$

The probability of the rest of the elements would change to the following formula:

$$p_i = n_i/(N + \alpha) \quad (6)$$

The parameter $\alpha$ can be used to adjust the rate of change. This mechanism is similar to Laplacian smoothing. In experimentation, the grammar was trained on approximately 1 million passwords resulting in about 11 thousand base structures. Updating this grammar can be accomplished almost instantaneously. Each time the grammar is updated, at least a portion of the probability values change, and the password distribution is changed. Entropy metrics facilitate understanding of how the dynamic update affects the probabilities.

b. Using the Entropy Metrics

To utilize entropy measures, the problems with theoretical distributions of passwords and those with empirical distributions of passwords should be distinguished. For empirical distributions, the min entropy being low is the same as the probability of the first guess being high. This simply means that a few initial passwords might be guessed easily, but this might be expected in any realistic distribution. Generally, through experimentation the current system has provided a relatively high min entropy. However, the min entropy provides little relevance since the system generally would not propose the first few high probability passwords.

Additionally, the Shannon entropy distribution should be reasonably high. Because the exact Shannon entropy H(X) of probability distribution can be calculated, described infra, a lower bound on the guessing entropy G can also be computed, using a bound derived by Massey (J. Massey, "Guessing and entropy," 1994 IEEE Symposium on Information Theory, pp. 204, 1994).

$$G(X) \geq \tfrac{1}{4} 2^{H(x)} + 1 \quad (7)$$

In the experiments used to test the system, the Shannon entropy of the original password checker distribution was about 27, which can be viewed as equivalent to a space of 227 different passwords. Even with the moderate value of 27 Shannon entropy, the total number of guesses possible by the grammar is beyond the trillions. Thus, a reasonable reject function is needed, as there are many possible passwords with very small probabilities, if the system has a higher Shannon entropy, then the new distribution of passwords would be more resistant to an optimal password cracking attack. Thus, used properly, Shannon entropy of the grammar can be useful in the grammar update function of the system.

It should be noted that when ensuring strong passwords, there are two possible approaches. The first is to find a distribution from which any password chosen is hard to break. This is the approach taken by Verheul (E. R. Verheul, "Selecting secure passwords," M. Abe (Ed.): CT-RSA 2007, LNCS 4377, pp. 49-66, 2007). Thus, the guessing entropy has some meaning, but as discussed by Verheul, it must also be ensured that the min entropy is high. However, Verheul's approach does not ensure usability of the chosen password.

The second approach is to ensure that a specific password is hard to break, but it need not be randomly chosen from a given distribution. Experimentation on the current system utilized this approach, which additionally ensures usability, while also protecting against an optimal guessing attack. It is relatively irrelevant that some initial number of passwords from that distribution can be broken since these passwords would be identified as weak by the current system.

c. Shannon Entropy of the Grammar

Since the current system is a password guess generator that can generate passwords in probabilistic order, the Shannon entropy, guessing entropy and min entropy can be computed for the guesses generated by the system's context-free grammar by generating guesses and computing the entropy values. Since the system's password generator was developed through training on revealed passwords, these entropy values can be viewed as realistic values for the relevant password probability distribution. After training on a sufficiently large set of revealed passwords, the distribution (through the grammar) can be viewed as a reference model for the "true" probability distribution of passwords.

The Shannon entropy can be computed using only the probabilistic-context free grammar and without actually generating these guesses by utilizing well-known notions, such as joint entropy and conditional entropy (T. M. Cover and J. A. Thomas, Elements of Information Theory, Wiley, 1991). Let G be the random variable that is the distribution of the strings that are the passwords derived from the grammar. More precisely, it is the distribution of derivation trees, but since the grammar is non-ambiguous, it can be viewed as the strings themselves.

The context-free grammar fir a password distribution can be viewed as composed of several distributions. One distribution is from the start symbol S to the base structures, deemed the random variable B, and the second distribution is from the sentential forms of base structures to the terminals (the password guesses), deemed the random variable R (for rest). For example, if the base structures can take n different values b1, b2, ..., bn, where n is the total number of base structures, then since S→bi, the relationship p(S→bi)=p(B=bi) is formulated. The random variable R|B is itself computable from the probability distributions represented by each component of the base structure because of independence of the component derivations. Table 4 is a simple example of the context free grammar of Table 1 illustrating B and R|B with some sample probability values.

TABLE 4

Example CFG for entropy calculation.

| Random Variable B | | Random Variable R\|B | |
|---|---|---|---|
| Rule | Probability | Rule | Probability |
| S→D$_3$L$_3$S$_1$ | 0.8 | D$_3$L$_3$S$_1$→ 123dog! | 0.1976 |
| | | 123dog# | 0.1824 |
| | | 123cat! | 0.1976 |
| | | 987cat# | 0.0576 |
| S→S$_2$L$_3$ | 0.2 | S$_2$L$_3$→ **cat | 0.31 |
| | | !!dog | 0.085 |

Not shown are the random variables L5, D3, S1, L3, and D2. For example, the random variable D3 has the distribution as shown in Table 1. The following theorem was derived to calculate Shannon entropy from a context-free grammar.

Theorem of Entropy of a Grammar: The Shannon entropy of a probabilistic context free grammar H(G) can be computed from the entropies of the various random variables defining the grammar. Assume the base structure bi is of the form Xi1Xi2 ... Xiki where each component is of the form Lj or Dj or Sj in the grammar. Then:

$$H(G)=(B,R)=H(B)+H(R|B)$$
$$=H(B)+\Sigma_i[H(X_{i_1})+H(X_{i_2})+ \ldots +H(X_{i_{ki}})] \quad (8)$$

The proof of the above is straightforward from the definitions of joint and conditional entropy. For example, Using this theorem for the simple grammar of Table 1, the Shannon entropy can be calculated to being H(G)=3.42.

The Shannon entropy of the probabilistic distribution G can be calculated in at least two ways: (1) generating the password guesses directly and computing the entropy, and (2) using the grammar itself through this theorem. These methodologies should result in the same Shannon entropy. Experiments were conducted on a plurality of sets of real-user passwords to verify this, and the entropy values resulted as expected.

d. Increasing Shannon Entropy

Figure 8:
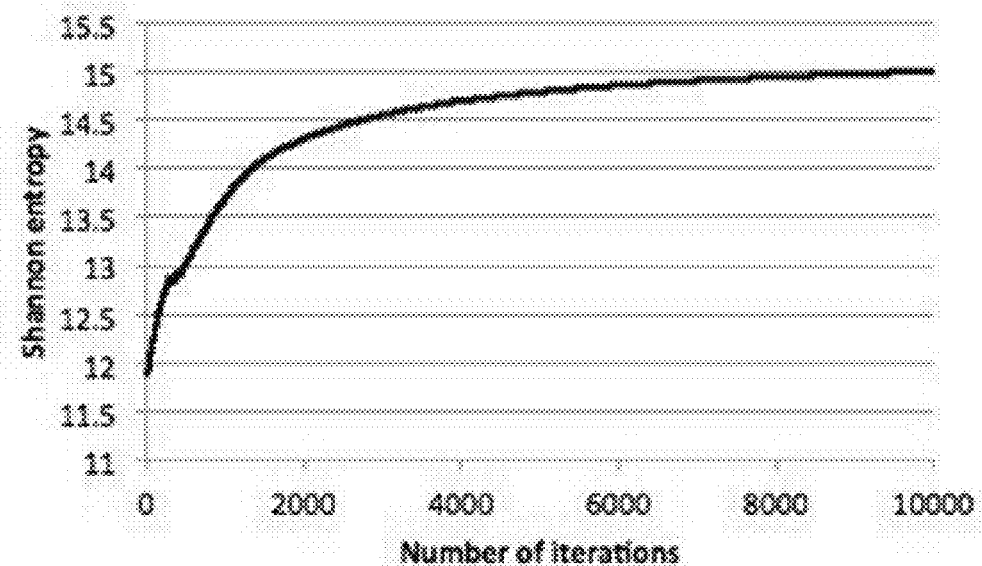
FIG. 8 is a line graph depicting the rising Shannon entropy levels as number of iterations increases.

An experiment was conducted to test the grammar update function. The experiment was conducted on a password training set of 740 real-user passwords randomly chosen from the MySpace set, resulting in 37667 password guesses. A new password was selected for the user in such a way that the password's probability was less than or equal to 1/n, where n was the total number of passwords in the distribution. The probability of the base structures and other components were then updated with the technique as discussed previously. These steps were repeated until there were no passwords with probability less than 1/n (i.e., the distribution became uniform). The theoretical Shannon entropy value for this uniform distribution is 15.2. FIG. 8 shows the changes in the Shannon entropy for each update round. As is evident, the system appears to approach the theoretical maximum Shannon entropy. A similar result was found for the guessing entropy.

Theoretically, having uniform distribution for passwords is ideal since in that distribution all passwords would have equal probabilities. Practically, this would mean that each password is equivalent to being randomly chosen. Using the system's update algorithm approaches uniform distribution, but the system likely cannot reach uniform distribution by not using the full key space of alpha strings (e.g., only using words proposed by users and the case operation) or exhausting the space of all 10-digit numbers.

Nevertheless, while maintaining usability, the system's grammar-modifying approach ensures that an attacker cannot take advantage of using a probabilistic password cracking approach. In the update algorithm, when updating the training set, the probabilities of the passwords are not modified directly, but only the password distribution is modified implicitly by changing the context-free grammar. Thus, it is not obvious that the Shannon entropy should be maximized for that grammar.

V. Hardware are and Software Infrastructure Examples

The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

EXAMPLE 1

I. Pre-Processing Phase a. Training & Context-Free Grammar

The process of developing certain embodiments of the current invention begins in the pre-processing phase. The system is trained on real-user passwords using the same technique used for training the probabilistic password cracker in U.S. patent application Ser. No. 13/547,779. After training, the real-user passwords are modeled into a context-free grammar with associated probabilities for each pre-terminal set to the frequencies of the different patterns found in them.

b. Setting the Threshold

The threshold is a probability value t that assumes that passwords with probability smaller than t are sufficiently strong, and passwords with probability larger than t are not sufficiently strong. The strength of a proposed password is related to the time it takes for an attacker to crack that password. Examples of ways to attack a password include brute force attacks and dictionary attacks. However, an assumption made herein is that an attacker can use the best available attack. If an attacker begins guessing from the highest probability order, the number of guesses g(t) he/she must make before guessing a password with probability equal to the threshold value of t can be determined. Thus, the calculations per hour c for each system can be calculated.

A first approach to setting the threshold includes running the guess generator of the probabilistic password cracker in U.S. patent application Ser. No. 13/547,779, and matching probability with total number of guesses the attacker must make before reaching that probability.

A second approach to setting the threshold provides a lower bound for g(t) until t is reached. This approach requires using the context-free grammar and does not require actually generating all the guesses. The algorithm starts with choosing t and estimating the number of elements in each base structure that are greater than this value, as depicted in FIG. 2.

Figure 2:
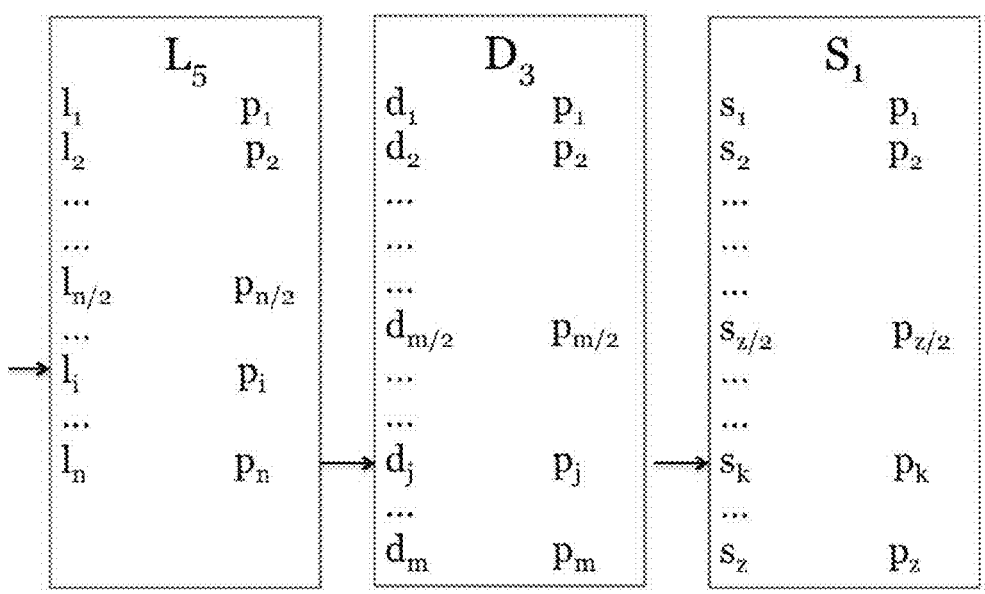
FIG. 2 is an example of setting the threshold using the context-free grammar.

For example, FIG. 2 depicts a first base structure of $b1=L5D3S1$ with probability p1 and t. The system can estimate the number of guesses from this base structure that have probability higher than t/p1. The middle elements, which are rank-ordered in terms of component probabilities from highest to lowest for each component (L5, D3, and S1), are tested. By binary search, a password with index in each component (i, j, and k), whose probability is closest to t/p1 but greater than or equal to it, can be found. This means that at least i*j*k guesses has probability greater than t/p1 for this base structure. This process can be repeated for additional base structures. By adding g(t) found for each base structure, a lower bound can be found on the total number of guesses to reach t. The same procedure can be used for the next proposed probability value.

II. The Reject Function

Users begin by entering a proposed password. Certain embodiments of the invention are based on an implicit creation policy, thus containing a reject function based on the strength of a proposed password. Upon receiving the proposed password, the system may calculate the probability of cracking the proposed password, using the context-free grammar generated in the preprocessing phase. The product of probabilities of components of the proposed password is pu probability of the user-chosen password. This probability pu allows determination of password strength in comparison to the threshold probability that defines if a password is strong.

If a base structure of the proposed password is not included in the context-free grammar, the password is either strong enough and accepted, or the lowest probability for the base structures can be found and set as an estimate for the probability of the base structure. If what cannot be found in the training set is a digit component or special character component, its probability associated with its values can be found since the grammar includes the values through smoothing on the training set. If an alphabet component of the password is not included in the training set, a probability associated with a word of the same length can be used, since all words of a same length can have equal probabilities.

III. Suggesting New Passwords

When a proposed password is rejected, certain embodiments of the invention create a new password that is strong (i.e., higher probability than the threshold) and is usable for the user by modifying the proposed password with slight changes. It is critical that the new password is both strong and usable.

Certain embodiments of the invention make only slight changes to the proposed password, so usability of the password is preserved for the user. These changes are made through a distance function, based on Edit distance to fulfill the need of usability for users. The distance function includes beginning modification of the proposed password with distance one from the proposed password. Probability of this modified password can be calculated using context-free grammar with the same technique used to calculate the probability of the proposed password. If the probability is an acceptable strength, it can be suggested to the user.

As used herein, the term "L" with subscript numerical refers to an alphabetical character, and the subscript numerical refers to the number of consecutive alphabetical characters within the password. For example, "L5" refers to five (5) consecutive alphabetical characters within a password. As used herein, the term "D" with subscript numerical refers to a numerical character, and the subscript numerical refers to the number of consecutive numerical characters within the password. For example, "D2" refers to two (2) consecutive numerical characters within a password. As used herein, the term "S" with subscript numerical refers to a symbol, and the subscript numerical refers to the number of consecutive symbols within the password. For example, "S1" refers to one (1) symbol within a password. Examples of symbols include, but are not limited to, the following: !, @, #, %, &.

a. Distance Functions

Distance functions can map a pair of strings to a real number d, where a smaller value of d indicates greater similarity between those two strings. Examples of distance functions include, but are not limited to, the Levenshtein distance function, the Edit distance function, and the Damerau-Levenshtein distance function. The Levenshtein distance is a metric for measuring the amount of difference between two sequences or strings of characters. The distance is the minimum number of operations needed to transform one of the sequences to the other one. An operation is defined as an insertion, deletion or substitution of a single character. The Damerau-Levenshtein distance is an extension of the Levenshtein distance but also counts transposition of two adjacent characters as an operation.

One embodiment of the current invention uses the Levenshtein distance function. Two sets of operations for the distance function may be defined. The operation can take place on the base structure or on the component. If the operation is on the base structure, three options exist insertion, deletion and/or transposition. Inserting a component of length one on the base structure is allowed when it is not of a same type of its adjacent components. For example, if the base structure is L5D3S1, a D1 can be inserted at the beginning to produce D1L5D3S1, but an L1 should not be inserted into that position. Functionally, this helps usability of the modified password for the user.

Deleting a component on the base structure can be done if the number of components is not one and if it does not make two components of the same type adjacent. For example, if the base structure is D2S1D1, D2 can be deleted to make S1D1, but S1 should not be deleted. Again, functionally this helps usability of the modified password for the user.

Exchanging two adjacent components on the base structure can be done if it does not make two components of the same type adjacent to each other. For example, if the base structure is D3S1D1, D3 and S1 should not be exchanged. Again, functionally this helps usability of the modified password for the user.

If the operation within the component itself, three options exist—insertion, deletion, and substitution. Inserting one character of the same type inside a component is allowed. For example, if component D3 is "123," a number "4" can be inserted at the beginning to modify D3 to "4123."

Deleting one character inside a component is allowed if the component is not equal to 1. Therefore, the whole component is not deleted.

Substituting a character inside a component is allowed if the original character is substituted with another character of the same type. For example, if S2 is "!!", it can be modified to "!#".

b. Modifier Algorithm

Figure 3:
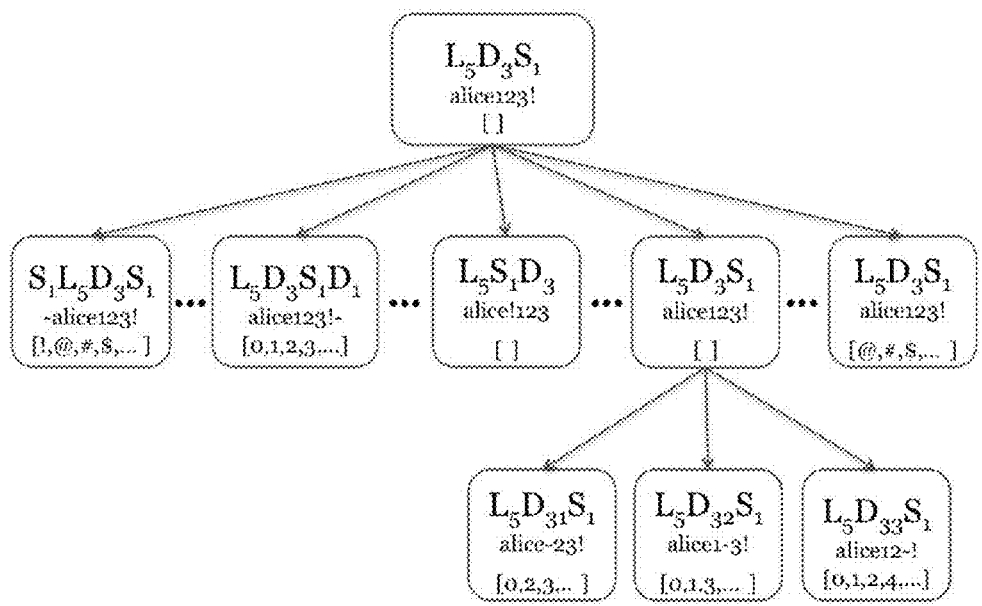
FIG. 3 is an example of modifier algorithm, creating modified passwords with distance one from the proposed password.

When users enter their proposed password, certain embodiments of the invention automatically parse their password to its base structure. To build a new password, the above-referenced steps may be taken. Each new base structure in the modified passwords will have a list of all possible substitutes to try. FIG. 3 depicts an example of the proposed password with possible substitutes to try stemming from it.

In FIG. 3, the proposed password is "alice123!" with base structure L5D3S1. Stemming from the base structure are examples of different operations, such as insertion in base structure where S1 is inserted in the first position resulting in a new base structure of S1L5D3S1 with a list of possible special characters. Another example is transposition in base structure where D3 and S1 are exchanged resulting in a new base structure L5S1D3. Another example is substitution in component D3, which, because of its "3" length, results in three possibilities, each for one digit within the D3 component. These modified passwords can be tried at random or systematically until a new password with acceptable strength is produced. If a modified password is traversed but still has unacceptable strength, each component can be marked, so a different password is analyzed during the next traversal, and so the same password is not given to another user.

If a password within distance 1 of the proposed password cannot be found with acceptable strength, a substantially similar process can be used to determine a password with distance 2.

Figure 4:
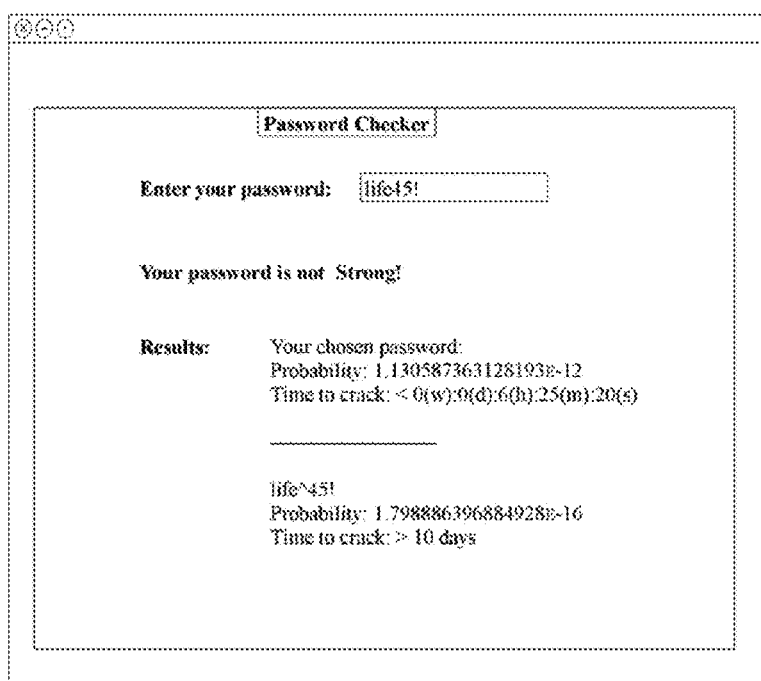
FIG. 4 is a snapshot of an embodiment of the current invention, suggesting a modified password to a user.

FIG. 4 depicts a snapshot of an embodiment of the current invention. In FIG. 4, a user has entered a proposed password of "life45!" The probability of the proposed password is calculated to being $1.13 \times 10-12$, which is larger than the threshold. Thus, this embodiment has suggested a new password using the modifier algorithm and choosing one of the operations randomly. In this example, the suggested password is "life^45!" which was created by an insertion operation in the base structure.

IV. Maintaining/Updating the System

One issue that arises with using certain embodiments of the current invention is that stronger passwords lose their strength when they are used more often. The stronger passwords in the training set gain a higher probability in the guessing generator, so an attacker can crack the passwords more easily. Thus, certain embodiments of the current invention update the training set with the modified passwords, so once a modified password gets a higher probability and does not pass the threshold, the system will not suggest it anymore.

Once a modified password is added to the training set for strength evaluation, a new context-free grammar may be generated, as described previously, or a new context-free grammar may not be generated. If a new context-free grammar is not generated, the probability value of the modified password would be adjusted. Since the probability value of the modified password is the frequency of the components and base structures used in the training set, only the frequency of the components and base structures used in the modified password needs to be updated.

For example, if a modified password is "!!78liar", only the probabilities of the base structures, S2 and D2, need to be updated, since the letter parts of the password were not changed. By considering the probability of each element as the frequency of it in the training set, the result would be $pi=ni/N$, where $ni$ is the number of occurrences of the element and N is the total size of it. Seeing another element i would change the probability to $pi'=(ni+1)/(N+1)$, and the probability of the rest of the elements would change to $pj'=nj/(N+1)$. FIG. 5 depicts adjustments in the probability values for the modified password "!!78liar".

Knowing the entropy values are metrics for password strength, entropy values should be increased or even maximized. Shannon Entropy corresponds only with the average size of passwords in bits using an optimal coding for the passwords and the average information given by a distribution and does not say much about how attackers might try to break the system in a password-cracking attempt.

Guessing Entropy measures the resistance against offline attacks using an optimal strategy, which is trying the most probable password first, then the second most probable password, etc. Guessing Entropy is defined as the average number of tries for finding the password. The more guesses it takes for an attacker to crack a password, the more secure a system is. It has been shown that entropy H for a discrete distribution is upper-bounded by the Guessing Entropy, G, of the distribution by: $H \leq 2 + \log(G-1)$.

On the other hand, a large Shannon Entropy (and consequently Guessing Entropy) by itself is not sufficient to guarantee a secure password distribution. In cases when the probability of the first guess goes to one, even if the Guessing Entropy is large, the distribution is not secure since the attacker would likely find the password guess in the first try. This has been shown by Min Entropy $H\infty(X)$ given by $-\log(p1)$. For a password distribution to be secure, the Guessing Entropy should be large, and the Min entropy should also be large, or equivalently p1 should be small.

In one example, for a probability density function X on a finite set $\{x1, x2, \ldots, xn\}$, $H(X) \leq \log n$, with equality if and only if X is uniform, i.e., $p(xi)=1/n$ for all i.

In another example, for a finite discrete distribution, the Guessing Entropy can be maximized when $pi=1/n$, where n is the number of elements. As proof, an assumption can be made that the claim is not true. Thus, the maximum Guessing Entropy occurs for a distribution with at least two values not equal to 1/n. Let these be pK and pL with $pK=1/(n+\epsilon)$ and $pL=1/(n-\epsilon)$. If every value of a new distribution is the same as the previous one, except that pK is decreased by $\epsilon/2$ and pL is increased by $\epsilon/2$, where $\epsilon=\min(pK^*pK+1, pL-1-pL)$. Thus, the difference between the Guessing Entropy for the first distribution G1 and the Guessing Entropy of the new distribution G2 is equal to: $G2-G1=K(pK-\epsilon)-K^*pK+L(pL+\epsilon)-L^*pL=L\epsilon-K\epsilon=\epsilon(L-K)>0$. Because the value of Guessing Entropy is increase by the change, the original assumption is contradicted, and the claim stands valid.

In one example, a user may enter his proposed password, and if rejected by the system, the user would get a suggestion for the modified password in return. The system may select the modified password for the user in a way that its probability is less than or equal to 1/n, where n is the total number of passwords in the distribution. Then the probability of the base structures and other components can be updated in the training set. These steps may be repeated until there is no password with probability less than 1/n.

Figure 6A:
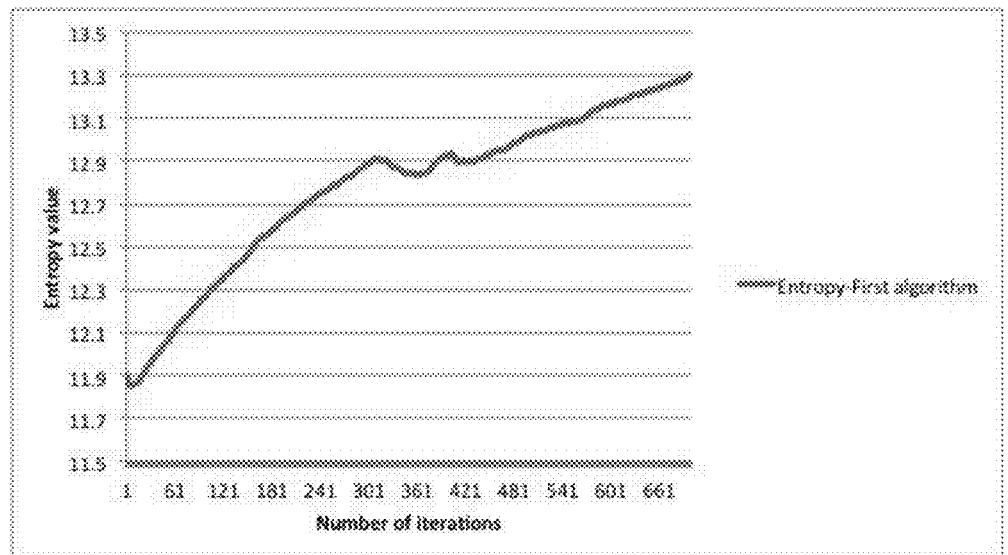
FIG. 6A is a line graph depicting the changes in Shannon Entropy for an example password set using a first algorithm (iteration 1-700)
Figure 6B:
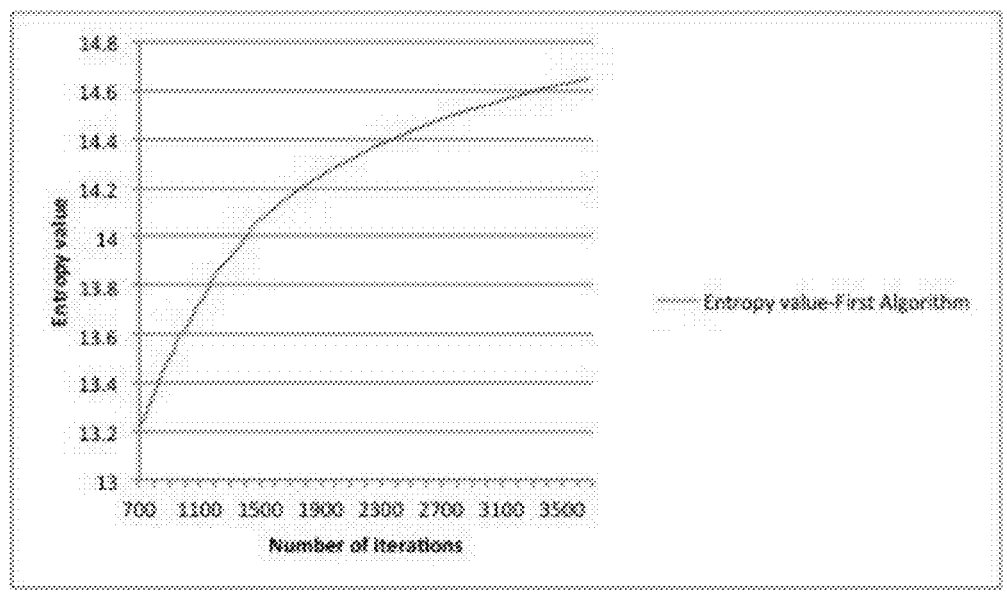
FIG. 6B is a line graph depicting the changes in Shannon Entropy for an example password set using the first algorithm of FIG. 6A (iteration 700-3500)

This was performed on a password set of 740 real-user passwords randomly chosen from a training set which resulted in 37667 password guesses. The maximum Shannon Entropy value for this distribution was 15.2011. FIG. 6A depicts the change in Shannon Entropy for the beginning of each round. As shown in FIG. 6A, the entropy starts decreasing and is not monotonic, but after about 700 iterations, the entropy starts to increase monotonically, as shown in FIG. 6B.

In another example, a modified password was selected for a user in a way that its probability is the smallest probability in the distribution. The probability of the base structures and other components can be updated in the training set. These steps can be repeated until there is no password with probability less than 1/n, where n is the total number of passwords in the distribution.

Figure 7A:
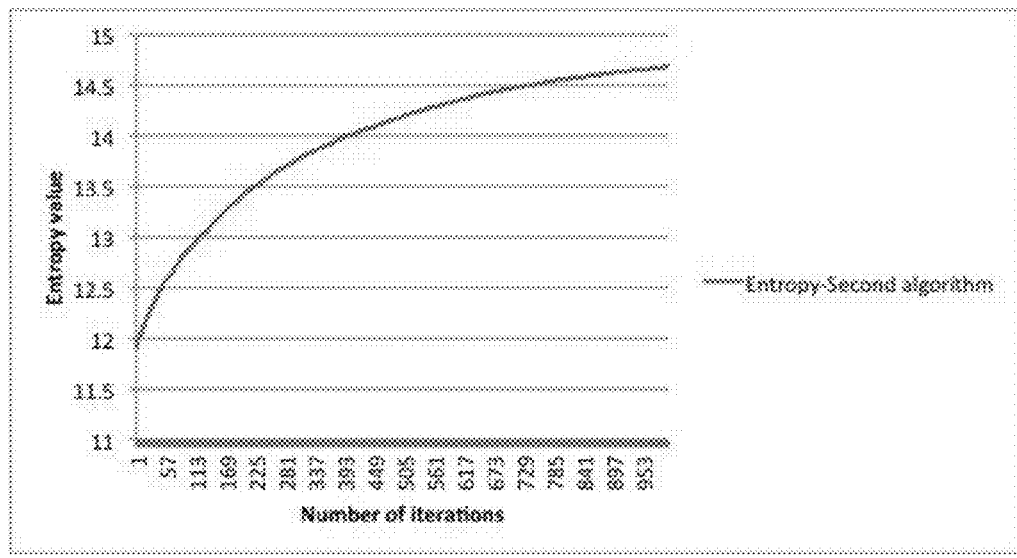
FIG. 7A is a line graph depicting the changes in Shannon Entropy for an example password set using a second algorithm.
Figure 7B:
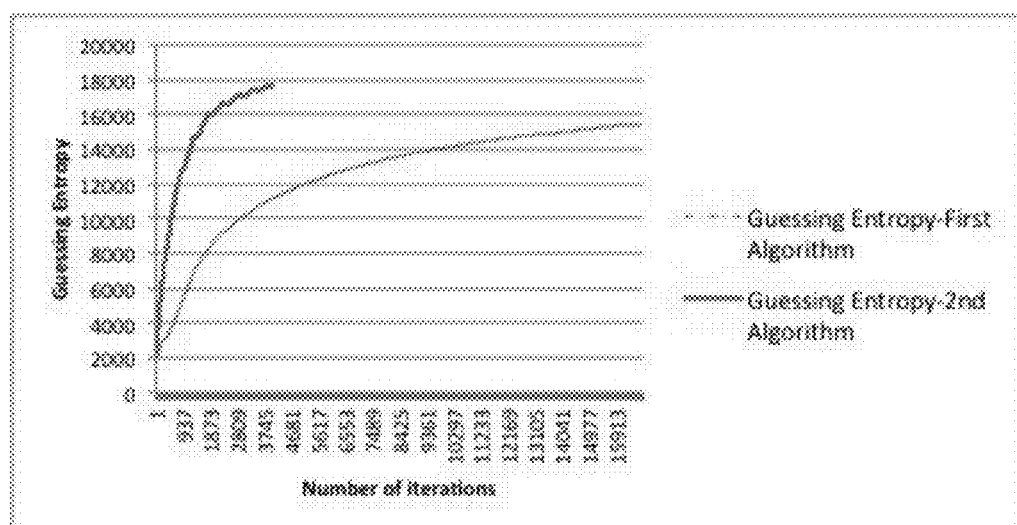
FIG. 7B is a line graph comparing the changes in Guessing Entropy for an example password set using the first algorithm of FIG. 6A and the second algorithm of FIG. 7A.

Using the same password set as the previous example, the maximum entropy reached was about 15.17 in about 7000 rounds. FIG. 7A depicts the absolute increase in entropy for each round, converging to its maximum more quickly. FIG. 7B depicts the increasing Guessing Entropy for both algorithms, illustrating a faster convergence to the maximum Guessing Entropy. The maximum Guessing Entropy in FIG. 7B is around 18,834 for that set.

In the algorithms of the previous examples, the probabilities of the passwords are not being changed directly, but the password distribution is being changed implicitly by changing the context-free grammar. It was not obvious how the distribution would change by changing the context-free grammar since the updating algorithm not only changes the probability of the base structure that was added to the training set, but also changes the probability of the other base structures and other components in each iteration.

EXAMPLE 2

I. Preprocessing and Experiment Setup

The effectiveness of the novel password analysis and modification system was tested on several sets of revealed passwords. The analysis component of the system essentially is the password checker. The grammar of this password checker is used to set the thresholds between strong and weak passwords, and analyze the user-proposed passwords. Two password-cracking approaches were used to try to break passwords, including those that had been identified as weak and made strong by the current system.

Three lists of revealed passwords were obtained for the experiments. The first list was the RockYou password list (A. Vance, "If your password is 123456, just make it hackme," New York Times, January 2010, http://www.nytimes.com/2010/01/21/technology/21password.html), which was released in December 2009 and contains 32 million passwords. Two million random plain text passwords were used from this list for the experiments. The second list was a MySpace password list, which contained 61,995 plain text passwords and was the result of an attack against MySpace users in 2006 (Robert McMillan, "Phishing attack targets MySpace users," http://www.infoworld.com/d/security-central/phishing-attack-targets-myspace-users-614, Oct. 27, 2006). The third list was the result of an attack against Hotmail users in October 2009 and contains 9,748 plain text passwords (T. Warren, "Thousands of Hotmail Passwords Leaked," http://www.neowin.net/news/main/Sep. 9, 2005/thousands-of-hotmail-passwords-leaked-online).

Each of these lists were randomly split into separate sets for the following methodology: (1) training the system's password checker (RockYou: one million, MySpace: 30,997, Hotmail: 4,874); (2) testing the system (RockYou: ½ million, MySpace: 15,499, Hotmail: 2,437); and (3) training a probabilistic password cracker (RockYou: ½ million, MySpace: 15,499, Hotmail: 2,437). The probabilistic password cracker was intentionally trained on a different set than is used for the system's password checker. For the training sets, passwords were combined from the RockYou, MySpace, and Hotmail password lists together in order to maintain a comprehensive set for the training that also considered that the different websites might have had different password policies for required lengths and other rule-based restrictions. The input dictionaries "common passwords" (The Open wall group, John the Ripper password cracker, http://www.openwall.com) and "dic-0294" (A list of popular password cracking wordlists, 2005, http://www.outpost9.com/files/WordLists.html) were used to train both the system's password checker and the probabilistic password cracker. In the system's password checker, the alphabetical part of the password is not checked against the dictionary; it is assumed that the alphabetical part is included in the dictionary, so the probability value of words of that length were used for that component.

The threshold value for the experiments were set using the approach described previously (i.e., running the probabilistic password cracker of the pre-processing phase (once) and generating a table that produces guesses and their probabilities at various time intervals) and the AMP password checker grammar to generate the guesses and their probability values. The results were depicted in Table 2. The times shown in Table 2 are the corresponding times for performing an MD5 hash on that number of guesses on the specific machine used for cracking. At this point, the pre-processing phase of the current system was completed and a threshold can be set as desired. The Shannon entropy value for this grammar calculated by the Theorem of Entropy of a Grammar was 26.78.

B. Implementation

The user interface of the current (w) ich may be written in Java, for example) receives as input one or more passwords. It checks the probability of the user-proposed password against the threshold and tries to strengthen it within edit distance one if the password is weak. The threshold value was set equivalent to different time periods, for example one day (24 hours), meaning that a password is called weak if it can be cracked within one day, and it is strong if it cannot be cracked within one day, though a threshold value of one day generally is not an ideal value from a practical standpoint. Other threshold values were tested as well. FIG. 4 shows a snapshot of the current system with the user proposed password "life45!" as the input. The probability of the user-selected password as well as the probability value of the new password is shown along with the approximate time to crack.

C. Password Cracking Results

To test the password analysis, two password-cracking systems were utilized: (1) John the Ripper (The Open wall group, John the Ripper password cracker, http://www.openwall.com); and (2) a probabilistic password cracker similar to that taught in U.S. patent application Ser. No. 13/547,779. John the Ripper was executed in incremental mode, which according to the documentation is their most powerful cracking mode and eventually tries all possible character combinations as passwords (The Open wall group, John the Ripper password cracker, http://www.openwall.com).

In the first series of results, the threshold value for the password checker was set to one day; thus, the number of guesses made by both password crackers was limited to 43.2 billion guesses. This number is the approximate number of guesses that could be hashed by password crackers in one day.

To compare the current system's password checker with conventional password checkers (e.g., MICROSOFT® password meter), the threshold value thp of the password checker was mapped to their score of weak and strong passwords. For example, MICROSOFT® outputs weak, medium, strong, and best scores as the result of its password analysis/checking. Since its algorithm to score the strength of passwords was unknown, this comparison was not possible.

Tables 5 and 6 show the results of the password cracking by John the Ripper and by the probabilistic password cracker, respectively, for a threshold value of one day. The cracking results when using the current system were divided into four different groups. The first group is referred to herein as "originally strong". The system had determined these passwords as being strong based on the set threshold. The second group is referred to herein as "originally weak not able to make stronger". These were passwords that the system both had recognized as weak and had tried all possible modifications within distance one to strengthen them but had been unsuccessful in lowering the modified probability values below the threshold value. The third group of passwords is referred to herein "originally weak passwords able to make stronger". These were passwords that the system both had recognized as weak, and had strengthened with modifications within edit distance one to modified probability values below the threshold value. This third set contains the weak passwords prior to modification. The associated modified passwords are in the fourth group, which is referred to herein as "strengthened passwords modified from weak". This fourth set contains strong passwords, as determined by the system, relative to the threshold. Results show that both originally strong and strengthened passwords modified from weak passwords have very low rate of cracking compared with weak passwords. As can be seen in Table 5, John the Ripper was able to crack less than 1% of the originally strong and strengthened passwords. As can be seen in Table 6, the probabilistic password cracker was able to crack about 5% of the originally strong and strengthened passwords.

TABLE 5

Password cracking results using John the Ripper.

| | Originally Strong Passwords | Originally Weak Passwords (Not able to make stronger) | Originally Weak Passwords (Able to make stronger) | Strengthened Passwords Modified from Weak of previous column |
|---|---|---|---|---|
| Hotmail | | | | |
| cracked/total | 2/325 | 49/53 | 988/2,059 | 2/2,059 |
| Percentage | (0.61%) | (92.45%) | (47.98%) | (0.0975%) |
| MySpace | | | | |
| cracked/total | 23/1484 | 104/149 | 5,343/13,866 | 71/13,866 |
| Percentage | (1.55%) | (69.80%) | (38.53%) | (0.51%) |
| RockYou | | | | |
| cracked/total | 281/32,794 | 22,248/24,745 | 235,302/442,461 | 1,186/442,461 |
| Percentage | (0.86%) | (89.90%) | (53.18%) | (0.27%) |

TABLE 6

Password cracking results using the probabilistic password cracker.

|  | Originally Strong Passwords | Originally Weak Passwords (Not able to make stronger) | Originally Weak Passwords (Able to make stronger) | Strengthened Passwords Modified from Weak of previous column |
|---|---|---|---|---|
| Hotmail |  |  |  |  |
| cracked/total | 1/325 | 53/53 | 1,069/2,059 | 113/2,059 |
| Percentage | (0.3%) | (100%) | (51.91%) | (5.48%) |
| MySpace |  |  |  |  |
| cracked/total | 27/1,484 | 135/149 | 8,341/13,866 | 698/13,866 |
| Percentage | (1.81%) | (90.60%) | (60.15%) | (5.03%) |
| RockYou |  |  |  |  |
| cracked/total | 467/32,794 | 24,378/24,745 | 259,027/442,461 | 18,134/442,461 |
| Percentage | (1.42%) | (98.51%) | (58.54%) | (4.1%) |

Figure 9:
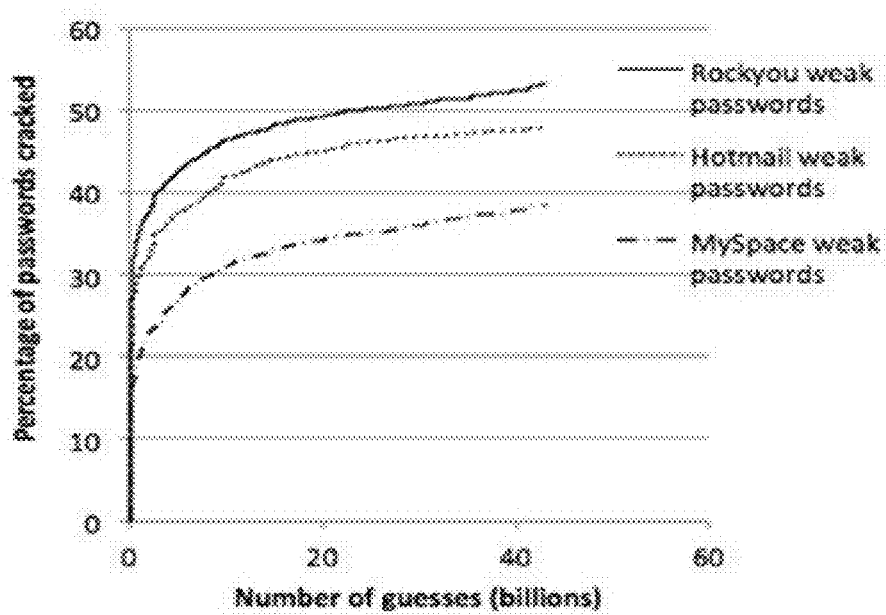
FIG. 9 is a line graph depicting how quickly weak passwords, which were capable of being strengthened, were able to be cracked.

FIG. 9 shows how fast the weak passwords (that could be strengthened) were able to be cracked. With only 1 billion password guesses, which can be made in less than one hour, about 20% of MySpace passwords, 30% of Hotmail and 35% of RockYou passwords were cracked. In one day (i.e., set threshold), these numbers reached to 38%, 48% and 53%, respectively.

Figure 10:
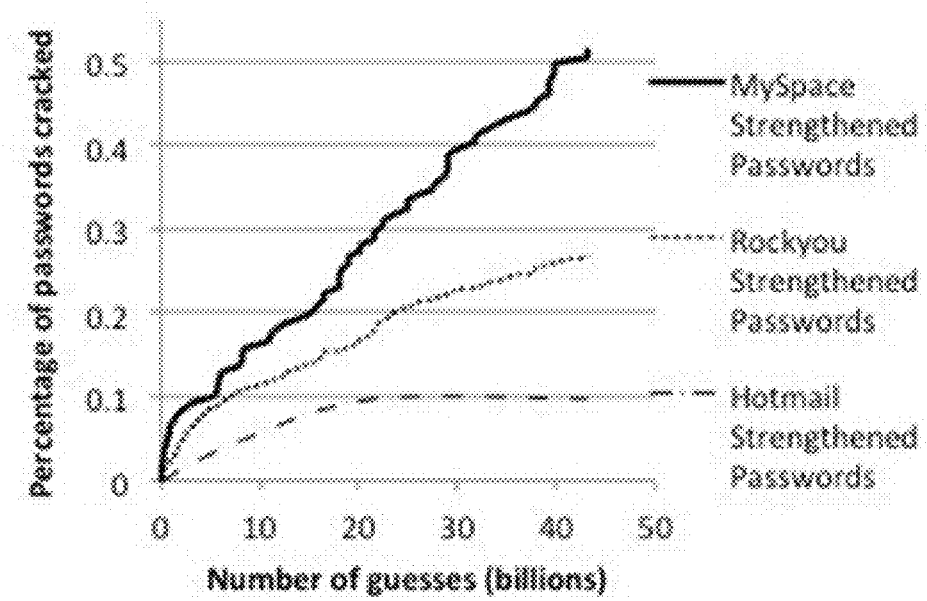
FIG. 10 is a line graph depicting the difficulties of cracking strengthened passwords.

The analogous curve for strengthened passwords is shown in FIG. 10. Less than 1% of passwords had been cracked in the 24-hour period of time. FIG. 10 shows the percentage of strengthened passwords cracked over time by John the Ripper. These passwords are the modified, strengthened passwords from FIG. 9. The passwords of FIG. 9 were strengthened by the current system. FIGS. 9 and 10 show how much the rate of cracking had decreased after modification.

Overall, prior to utilizing the system, the total rate of cracking the test password set was about 56.6% with the probabilistic password cracker. Upon utilizing the system, since it only allows strong passwords (columns 1 and 4 of Table 6), the cracking rate is about 3.9%. The analysis system successfully determines weak passwords from strong ones with an error rate of 1.43% (column 1). This rate is the percent of passwords originally identified as strong, but that can be cracked. As seen, at least some (39%) of passwords were deemed as weak but were unable to be cracked (columns 2 and 3). This experimentation deemed this type of error as acceptable since the implications are only that the experimentation was conducted conservatively and that some passwords deemed as weak could not be cracked.

Figure 11:
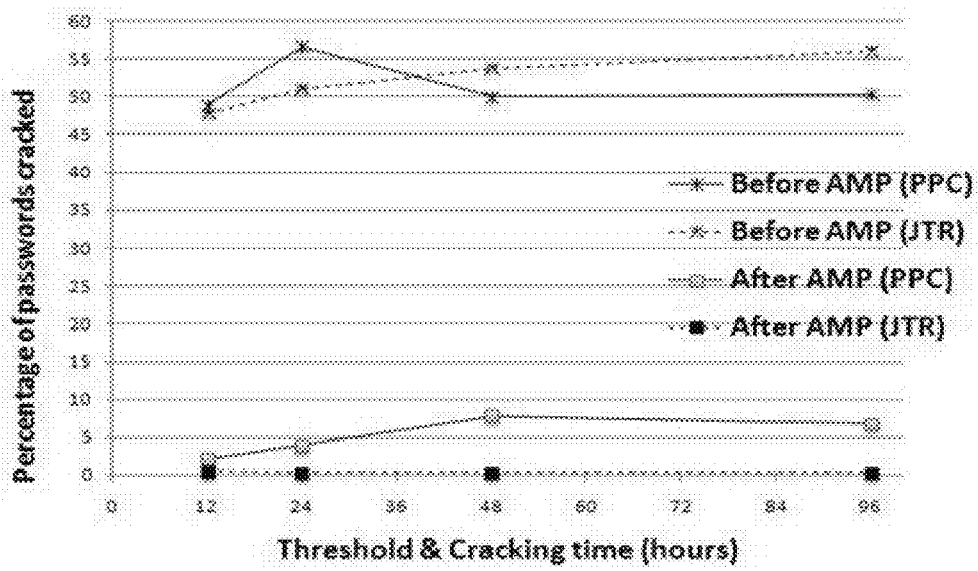
FIG. 11 is a line graph depicting the rate of cracking the test password set both before using the current system and after using current system for both John the Ripper (JTR) and the probabilistic password cracker (PPC).

Besides using the one-day threshold, similar tests were conducted using threshold values (see Table 2) for 12 hours, 48 hours and 96 hours. FIG. 11 shows the total rate of cracking the test password set before using the system and after using system for both John the Ripper (JTR) and the probabilistic password cracker (PPC). The time allocated for cracking was of course the same time as used for determining the threshold. The results are similar to the one-day results and even at four (4) days, the passwords deemed weak were significantly improved.

Some of the weak passwords could not be strengthened since this experiment was limited to changes of edit distance one. Furthermore, there were no restrictions (e.g., rule-based limitations) on the proposed passwords, such as minimum length. The identified weak passwords that could not be sufficiently strengthened were 4.0%, 4.8%, 18.6% and 37.7% of the total test password set for 12 hours, 24 hours, 48 hours, and 96 hours, respectively. As an example, the proposed password "123456" could not be strengthened below the threshold value. This was to be expected and would likely be remedied by allowing edit distance two or having some minimal restrictions on the input proposed password.

DEFINITIONS OF CLAIM TERMS

Adjacent position: This term is used herein to refer to a character that is immediately preceding or following another character Base structure: This term is used herein to refer to a sequence or combination of alpha, digit and/or special substring components that capture the length of the observed substrings.

Case operation: This term is used herein to refer to a process of inverting the case (uppercase/lowercase) of one character in the alphabetical component of a password.

Character: This term is used herein to refer to an alpha, numeric or special symbol.

Component: This term is used herein to refer to an element of the base structure. A component can contain one or more letters (possibly capitalized), digits, or special characters, with an associated number that indicates the number of characters within that component. Each component contains the same type of characters that are adjacent to one another.

Complexity value: This term is used herein to refer to the strength or effectiveness of a password in resisting guessing and password cracking attacks.

Control passwords: This term is used herein to refer to a set of words or keys aggregated or derived from real-user passwords and utilized to train the system in the preprocessing phase.

Crack: This term is used herein to refer to recovering passwords from data that has been stored in or transmitted by a computer system.

Decreasing probability order: This term is used herein to refer to the sequential order of password guesses, beginning with the most probable guess to crack a password, as would be made in an optimal password cracking attack.

Deletion operation: This term is used herein to refer to a process of deleting or removing a component of length one or more to a password, or deleting a character within one component.

Dictionary: This term is used herein to refer to an exhaustive list of words or keys that can be entered into computer software, such that these words or keys can be used to generate guesses and/or indirectly measure the strength of a password.

Digit: This term is used herein to refer to any sequence or combination of numeric characters. For example, numeric characters may include numbers 0 to 9.

Effort required to crack a password: This phrase is used herein to refer to the number of guesses or amount of time required for a password to be cracked.

Entropy: This term is used herein to refer to a well-known measure for a probability distribution.

Insertion operation: This term is used herein to refer to a process of inserting or adding a component of length one or more to a password, or adding a character to a component.

Known password or Real-user password: As used herein, these terms are used interchangeably to refer to a word or key that has become known to the public intentionally or unintentionally.

Length: This term is used herein to refer to the number of adjacent characters of the same type. For example, if length of a numerical component is one (1), then the component contains one number that has no numbers adjacent to it.

Letter: This term is used herein to refer to one or any sequence or combination of alphabetic characters. For example, letters within the English language may include letters A to Z.

Limited modification: This term is used herein to refer to a minimal change to a password, such that the modified password or second proposed password is still memorable to a user. A limited modification typically modifies a password with limited edit distance, which refers to the number of components or characters in modification (i.e., inserted, deleted, substituted, etc.) within a password. Typically, an edit distance of only one provides a password with sufficient strength, but greater than edit distance one is contemplated as well. The edit distance is "limited" in that only modification is allowed that would allow the modified password or second proposed password to remain memorable for the user Password guess: This term is used herein to refer to a password generated that has an associated probability value.

Probabilistic context-free grammar: This term is used herein to refer to a common notion of a grammar generated through the training step of the current invention by learning base structure and component structure probabilities.

Probabilistic password cracking system: This term is used herein to refer to a methodology and model of effectively and efficiently attempting to crack a password through the use of probability values assigned to the password guesses or to structures associated with the password guesses. The probabilistic password cracking system generates guesses in highest probability order based on the training it received.

Probability distribution: This term is used herein to refer to application of passwords that might be generated by probabilistic grammar or the expected distribution in the wild. Thus, if a system remains updated with the most recent known words, distribution of passwords and probability values can remain accurate.

Proposed password: This term is used herein to refer to sequence or combination of alpha, numeric and/or special characters that is inputted by a user or generated by the system, and is subject to cracking by password cracking systems and modification by the current password analyze-modify system.

Relevant password distribution: This term is used herein to refer to the distribution induced or represented by the probabilistic context-free grammar.

Real-user password: This term is used herein to refer to a word or key, possibly referring to a password, that has become known to the public either intentionally or unintentionally Special character: This term is used herein to refer to any sequence or combination of non-alpha and non-digit symbols. For example, non-alpha and non-digit symbols may include !@#$%^&*( )-_=+[ ]{ };:'",./<~?.

Substitution operation: This term is used herein to refer to a process of substituting or exchanging one character with another character.

Sufficient complexity: This term is used herein to refer to a password having a strength or effectiveness that meets or surpasses the threshold complexity value.

Threshold complexity value: This term is used herein to refer to a quantitative point at which a password is deemed strong or weak. If a password satisfies the threshold complexity value, for example by requiring a large amount of guesses over a period of time to be cracked, then the password is deemed strong. If the passwords fails to meet the threshold complexity value (i.e., is too easy to crack), then the password is deemed weak.

Transposition operation: This term is used herein to refer to a process of exchanging two adjacent components.

Type: This term is used herein to refer to a grouping of one or more characters within a component. Examples of types include alphabetic characters, numerical digits, and special characters.

User: This term is used herein to refer to an individual attempting to test the current password analyze-modify system or attempting to develop a password for a secure account that requires authentication.

The advantages set forth above, and those made apparent from the foregoing disclosure, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein disclosed, and all statements of the scope of the invention that, as a matter of language, might be said to fall therebetween.

What is claimed is:

1. A computer-implemented method of analyzing and modifying a first proposed password chosen by a user for a secured user account, said method comprising the steps of:

generating a probabilistic context-free grammar from an array of control passwords aggregated from real-user passwords;

establishing a threshold complexity value based on effort required to crack said array of control passwords, said first proposed password including a base structure containing a plurality of components, wherein the step of establishing said threshold complexity value includes setting a lower bound for a number of password guesses for said first proposed password until said threshold complexity value is reached, wherein said password guesses do not need to be generated, estimating a number of components in said base structure that are greater than said threshold complexity value, and estimating and establishing said threshold complexity value based on the forgoing steps;

receiving said first proposed password as inputted by said user into a computer interface of a computer system connected to a network;

deriving a complexity value of said first proposed password based on said context-free grammar;

comparing said complexity value of said first proposed password and said threshold complexity value, wherein said first proposed password is accepted as sufficiently complex as a result of said first proposed password meeting said threshold complexity value, wherein in the alternative, said first proposed password is rejected as not sufficiently complex as a result of said first proposed password failing to meet said threshold complexity value;

generating a second proposed password by limited modifications of said first proposed password as a result of said first proposed password being rejected as not sufficiently complex, said limited modifications resulting in said second proposed password, wherein said limited modifications have an edit distance of one (1) or two (2), where said edit distance is used to generate said second proposed password in a manner that is memorable to said user based on said user's first proposed password;

deriving a modified complexity value of said second proposed password based on said context-free grammar;

comparing said modified complexity value of said second proposed password and said threshold complexity value, said second proposed password accepted as sufficiently complex as a result of said second proposed password meeting said threshold complexity value, said second proposed password rejected as not sufficiently complex as a result of said second proposed password failing to meet said threshold complexity value; and suggesting said second proposed password to said user as a result of said second proposed password accepted as sufficiently complex.

2. A computer-implemented method as in claim 1, further comprising the steps of:
receiving one or more dictionaries, said step of generating said probabilistic context-free grammar further including generating said probabilistic context-free grammar from said one or more dictionaries; and
utilizing said one or more dictionaries to generate a plurality of password guesses in highest probability order to determine said threshold complexity value.

3. A computer-implemented method as in claim 1, further comprising the step of:
updating said probabilistic context-free grammar with at least one new password selected from the group consisting of said first proposed password, said second proposed password, and an additional plurality of control passwords.

4. A computer-implemented method as in claim 3, further comprising the step of:
increasing an entropy value of said context-free grammar as a result of said at least one new password having a sufficiently low probability to increase said entropy value.

5. A computer-implemented method as in claim 1, further comprising the step of:
parsing said first proposed password into a base structure containing a plurality of components,
said modification step including modifying said base structure or said plurality of components with said limited modifications.

6. A computer-implemented method as in claim 1, further comprising:
said limited modifications selected from the group consisting of an insertion operation, a deletion operation, a substitution operation, a transposition operation, and a case operation.

7. A computer-implemented method as in claim 6, further comprising:
said first proposed password having a base structure containing a plurality of components;
said insertion operation containing rules such that an inserted component is of a different type than a component selected from the plurality of components, said component being adjacent to said inserted component;
said deletion operation containing rules such that a deleted component has a length greater than one (1) and removal of said deleted component does not cause two of the same type components selected from said plurality of components to become adjacently positioned;
said substitution operation containing rules such that a first character is substituted with a second character, said first character and said second character being of a same type; and
said transposition operation containing rules such that transposing a first component and a second component does not does not cause two of the same type components selected from said plurality of components to become adjacently positioned.

8. A tangible non-transitory computer-readable media having computer-executable instructions for a computer processor to analyze and modify a first proposed password chosen by a user for a secured user account, the instructions comprising:
generating a probabilistic context-free grammar from an array of control passwords aggregated from real-user passwords;
establishing a threshold complexity value based on effort required to crack said array of control passwords,
said first proposed password including a base structure containing a plurality of components, wherein the step of establishing said threshold complexity value includes
setting a lower bound for a number of password guesses for said first proposed password until said threshold complexity value is reached, wherein said password guesses do not need to be generated,
estimating a number of components in said base structure that are greater than said threshold complexity value, and
estimating and establishing said threshold complexity value based on the forgoing steps;
receiving said first proposed password as inputted by said user into a computer interface of a computer system connected to a network;
deriving a complexity value of said first proposed password based on said context-free grammar;
comparing said complexity value of said first proposed password and said threshold complexity value,
wherein said first proposed password is accepted as sufficiently complex as a result of said first proposed password meeting said threshold complexity value,
wherein in the alternative, said first proposed password is rejected as not sufficiently complex as a result of said first proposed password failing to meet said threshold complexity value;
generating a second proposed password by limited modifications of said first proposed password as a result of said first proposed password being rejected as not sufficiently complex, said limited modifications resulting in said second proposed password,
wherein said limited modifications have an edit distance of one (1) or two (2), where said edit distance is used to generate said second proposed password in a manner that is memorable to said user based on said user's first proposed password;

deriving a modified complexity value of said second proposed password based on said context-free grammar;

comparing said modified complexity value of said second proposed password and said threshold complexity value, said second proposed password accepted as sufficiently complex as a result of said second proposed password meeting said threshold complexity value, said second proposed password rejected as not sufficiently complex as a result of said second proposed password failing to meet said threshold complexity value; and suggesting said second proposed password to said user as a result of said second proposed password accepted as sufficiently complex.

9. A tangible non-transitory computer-readable media as in claim 8, further comprising the steps of:

receiving one or more dictionaries, said step of generating said probabilistic context-free grammar further including generating said probabilistic context-free grammar from said one or more dictionaries; and utilizing said one or more dictionaries to generate a plurality of password guesses in highest probability order to determine said threshold complexity value.

10. A tangible non-transitory computer-readable media as in claim 8, further comprising the step of:

updating said probabilistic context-free grammar with at least one new password selected from the group consisting of said first proposed password, said second proposed password, and an additional plurality of control passwords.

11. A tangible non-transitory computer-readable media as in claim 10, further comprising the step of:

increasing an entropy value of said context-free grammar as a result of said at least one new password having a sufficiently low probability to increase said entropy value.

12. A tangible non-transitory computer-readable media as in claim 8, further comprising the step of:

parsing said first proposed password into said base structure containing a plurality of components, said modification step including modifying said base structure or said plurality of components with said limited modifications.

13. A tangible non-transitory computer-readable media as in claim 8, further comprising:

said limited modifications selected from the group consisting of an insertion operation, a deletion operation, a substitution operation, a transposition operation, and a case operation.

14. A tangible non-transitory computer-readable media as in claim 13, further comprising:

said first proposed password having a base structure containing a plurality of components;

said insertion operation containing rules such that an inserted component is of a different type than a component selected from the plurality of components, said component being adjacent to said inserted component;

said deletion operation containing rules such that a deleted component has a length greater than one (1) and removal of said deleted component does not cause two of the same type components selected from said plurality of components to become adjacently positioned;

said substitution operation containing rules such that a first character is substituted with a second character, said first character and said second character being of a same type; and said transposition operation containing rules such that transposing a first component and a second component does not does not cause two of the same type components selected from said plurality of components to become adjacently positioned.

* * * * *